(12) United States Patent
Dai et al.

(10) Patent No.: US 8,659,474 B2
(45) Date of Patent: Feb. 25, 2014

(54) NAVIGATION SYSTEM AND METHOD FOR RESOLVING INTEGER AMBIGUITIES USING DOUBLE DIFFERENCE AMBIGUITY CONSTRAINTS

(75) Inventors: Liwen L. Dai, Chino Hills, CA (US); Ronald R. Hatch, Wilmington, CA (US); Yujie Zhang, Lomita, CA (US); Min Wang, Irvine, CA (US)

(73) Assignee: Navcom Technology, Inc., Torrance, CA (US)

( * ) Notice: Subject to any disclaimer, the term of this patent is extended or adjusted under 35 U.S.C. 154(b) by 267 days.

(21) Appl. No.: 13/299,324

(22) Filed: Nov. 17, 2011

(65) Prior Publication Data

US 2012/0176271 A1 Jul. 12, 2012

Related U.S. Application Data

(60) Provisional application No. 61/432,172, filed on Jan. 12, 2011.

(51) Int. Cl.
*G01S 19/07* (2010.01)

(52) U.S. Cl.
USPC .................................................... 342/357.44

(58) Field of Classification Search
USPC .................................................... 342/357.44
See application file for complete search history.

(56) References Cited

U.S. PATENT DOCUMENTS

| | | | |
|---|---|---|---|
| 5,451,964 A | 9/1995 | Babu | |
| 5,841,026 A | 11/1998 | Kirk et al. | |
| 6,259,398 B1 * | 7/2001 | Riley | 342/357.26 |
| 7,026,982 B2 * | 4/2006 | Toda et al. | 342/357.27 |
| 7,768,451 B2 * | 8/2010 | Wu et al. | 342/357.23 |
| 2004/0130485 A1 | 7/2004 | Rapoport et al. | |
| 2009/0135057 A1 | 5/2009 | Vollath et al. | |
| 2010/0079333 A1 * | 4/2010 | Janky et al. | 342/357.02 |

FOREIGN PATENT DOCUMENTS

| | | |
|---|---|---|
| WO | 2008150390 A1 | 12/2008 |
| WO | WO 2008/150390 A1 | 12/2008 |

OTHER PUBLICATIONS

Navcom Technology, Inc., International Search Report and Written Opinion for International Application No. PCT/US2011/066720, dated Mar. 9, 2012, 13 pages.
Dai, L., et al., "Predicting Atmospheric Biases for Real-Time Ambiguity Resolution in GPS/GLONASS Reference Station Networks," Journal of Geodesy, vol. 76, 2003, pp. 617-628.

(Continued)

*Primary Examiner* — Harry Liu
(74) *Attorney, Agent, or Firm* — Morgan, Lewis & Bockius LLP

(57) ABSTRACT

A system and method for providing improved correction information to navigation receivers includes receiving, from a plurality of reference stations at known locations, a plurality of satellite navigation measurements of signals from a plurality of global navigation satellites. A state of the plurality of global navigation satellites is computed based on the received satellite navigation measurements. Baselines, each corresponding to a pair of the reference stations, are identified. For each identified baseline, computing floating and integer values for a double-differenced integer ambiguity. Double-differenced integer ambiguities that satisfy a set of predefined conditions are identified, and the computed state of the plurality of global navigation satellites is adjusted in accordance with an integer value constraint applied to each double-differenced integer ambiguity that satisfies the set of predefined conditions. The correction information is computed from the adjusted computed state of the plurality of global navigation satellites.

28 Claims, 9 Drawing Sheets

(56) References Cited

OTHER PUBLICATIONS

Sun, H., et al., "Real-Time GPS Reference Network Carrier Phase Ambiguity Resolution," Proc. Nat'l Technical Meeting, San Diego, California, Jan. 25-27, 1999, pp. 193-199.

Wang, J., et al., "A Discrimination Test Procedure for Ambiguity Resolution On-The-Fly," Journal of Geodesy, vol. 72, 1998, pp. 644-653.

International Search Report and the Written Opinion of the International Searching Authority dated Mar. 9, 2012 (13 pages).

* cited by examiner

NAVIGATION SYSTEM AND METHOD FOR RESOLVING INTEGER AMBIGUITIES USING DOUBLE DIFFERENCE AMBIGUITY CONSTRAINTS

RELATED APPLICATION

This application claims priority to U.S. provisional application Ser. No. 61/432,172, filed Jan. 12, 2011, which is incorporated herein by reference in its entirety.

TECHNICAL FIELD

The disclosed embodiments relate generally to systems and methods for generating correction information, for respective satellites in a satellite-based navigation system, and more specifically to generating improved correction information by resolving integer ambiguities in range measurements made by reference stations using double difference integer ambiguity constraints.

BACKGROUND

A Kalman filter may be used to solve for static and dynamic parameters in a dynamic system having noisy measurements. One such system is a Global Navigation Satellite System (GNSS), in which satellite navigation measurements by navigation receivers (e.g., receivers on or near the surface of Earth) are affected by several sources of noise (e.g., multipath effects, ionospheric effects, tropospheric effects, etc.).

One application of Kalman filters is a Kalman filter (e.g., in a "wide area differential GPS (WADGPS) system") that tracks the orbits of thirty global navigation satellites using a set of reference stations (e.g., 50 to 80 reference stations) located around the world. The resulting orbital solutions are compared with the "almanac" data locations and trajectories of the satellites (herein after called almanac data), combined with the ephemeris information broadcast by the satellites or other systems, that provide navigation receivers with adjustments to the almanac data. The difference between the orbital solutions produced by the Kalman filter and the adjusted almanac data is used to generate correction information, sometimes called aiding data or differential data, that is broadcast to subscribers' navigation receivers (e.g., navigation receivers whose owners have paid a subscription fee). StarFire, a system and service provided by NavCom Technology, Inc., is an example of a system that tracks the orbits of global navigation satellites and transmits correction information to subscribers' navigation receivers. The differential data, when used by compatible navigation receivers, enables those receivers to more accurately determine their position, in some implementations with an accuracy of better than one meter.

It would be highly desirable to provide a system and method that determines improved correction information so as to enable navigation receivers to achieve higher levels of accuracy.

SUMMARY

To provide improved correction information, some embodiments provide a system, a non-transitory computer readable storage medium including instructions, and a computer-implemented method for receiving, from a plurality of reference stations at known locations, a plurality of satellite navigation measurements of signals from a plurality of global navigation satellites. The method includes computing a state of the plurality of global navigation satellites based on the received satellite navigation measurements, identifying a plurality of baselines, each baseline corresponding to a pair of the reference stations, and for each identified baseline, computing floating and integer values for a double-differenced integer ambiguity corresponding to the identified baseline. The method further includes identifying, in accordance with the computed floating and integer values for the double-differenced integer ambiguities corresponding to the plurality of identified baselines, a set of one or more double-differenced integer ambiguities that satisfy a set of predefined conditions. In addition, the method includes adjusting the computed state of the plurality of global navigation satellites, in accordance with an integer value constraint applied to each double-differenced integer ambiguity in the identified set of one or more double-differenced integer ambiguities that satisfy the set of predefined conditions, to produce an adjusted computed state of the plurality of global navigation satellites.

In some embodiments, the method includes computing correction information in accordance with the adjusted computed state of the plurality of global navigation satellites, and transmitting the correction information to a plurality of navigation receivers. Typically the correction information includes correction values for each of the global navigation satellites in the plurality of global navigation satellites, and more generally includes correction values for two or more of the global navigation satellites in the plurality of global navigation satellites.

In some embodiments, the set of predefined conditions for a respective double-differenced integer ambiguity includes a requirement that a fractional difference between the integer and floating values of the respective double-differenced integer ambiguity does not exceed a first predefined threshold value. Furthermore, in some embodiments, the method includes computing a variance and standard deviation of the respective double-differenced integer ambiguity, and the set of predefined conditions for the respective double-differenced integer ambiguity includes a requirement that the standard deviation of the respective double-differenced integer ambiguity does not exceed a second predefined threshold value. Yet further, in some embodiments, the set of predefined conditions for the respective double-differenced integer ambiguity includes a requirement that a predefined W-ratio have a value that exceeds a third predefined threshold value.

In some embodiments, the identified baselines include only mathematically independent baselines.

In some embodiments, identifying the set of one or more double-differenced integer ambiguities that satisfy the set of predefined conditions includes filtering the double-differenced integer ambiguities corresponding to the identified baselines so as to prevent any double-differenced integer ambiguities that fail to satisfy predefined filtering criteria from being included in the identified set.

BRIEF DESCRIPTION OF THE DRAWINGS

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth. However, it will be apparent to one of ordinary skill in the art that the present invention, as defined by the claims, may be practiced without many of these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact. The first contact and the second contact are both contacts, but they are not the same contact.

The terminology used in the description herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Figure 1:
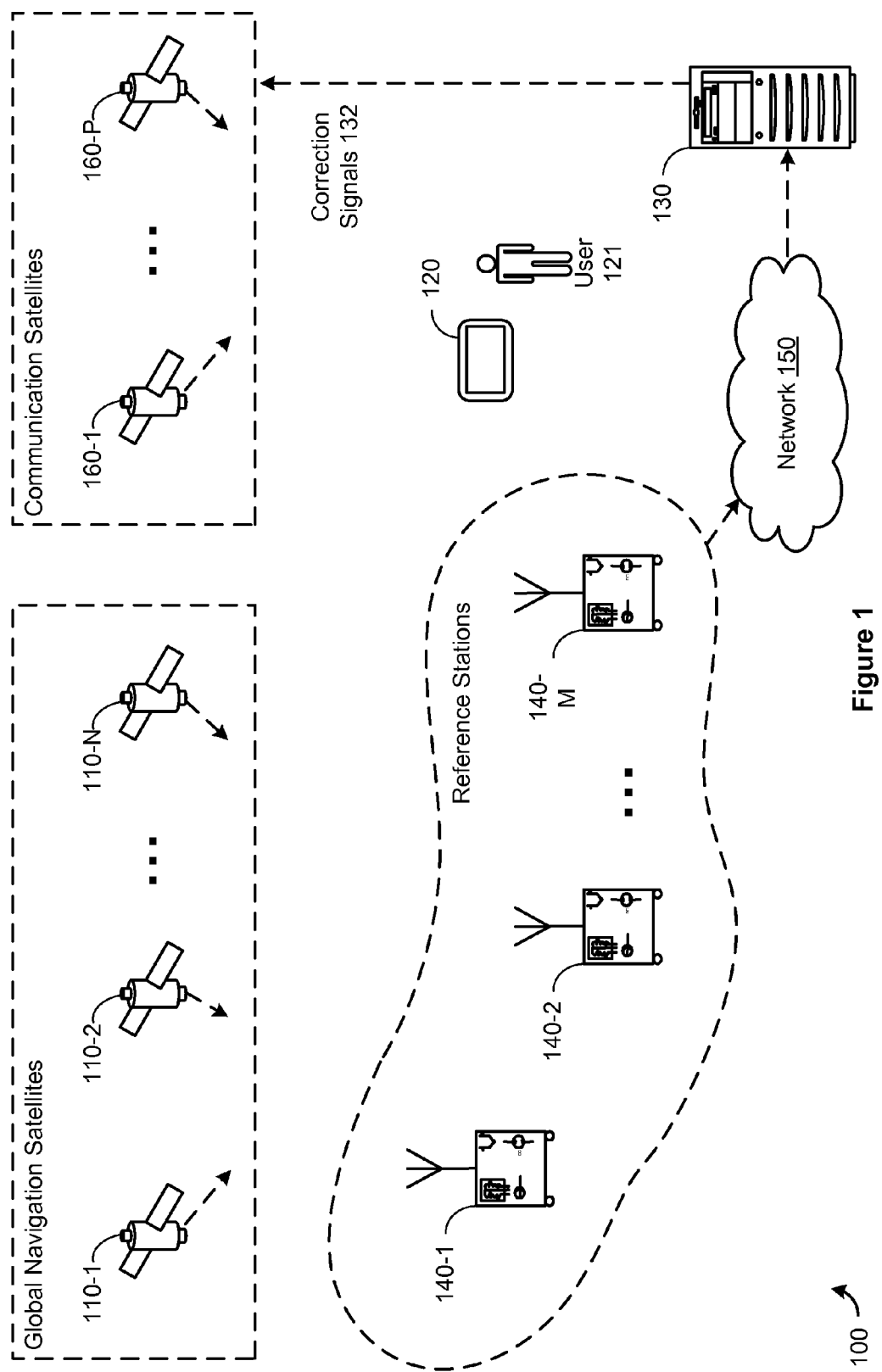
FIG. 1 is a block diagram illustrating global satellite navigation system, according to some embodiments.

FIG. 1 is a block diagram illustrating global satellite navigation system 100, according to some embodiments. The global satellite navigation system 100 includes global navigation satellites 110-1 to 110-N. The global navigation satellites 110-1 to 110-N each transmit at least two carrier signals. In the case of the Global Positioning System (GPS), the carrier signals include the L1 and L2 signals having frequencies of 1.5754 GHz and 1.2276 GHz, and wavelengths of 0.1903 m and 0.2442 m, respectively. The next generation GPS will offer a third carrier signal, L5, that will have a frequency of 1.1765 GHz, and a wavelength of 0.2548 m. Note that although the embodiments described herein are described with respect to GPS, other Global Navigation Satellite Systems (GNSS), such as GLONASS and Galileo, may be used.

In some embodiments, the carrier signals are received by a satellite navigation receiver 120. The satellite navigation receiver may be used by a user 121 for navigation or for determining a current position of the user 121. In order to perform navigation and/or position determination operations, the satellite navigation receiver 120 receives signals from a subset of the global navigation satellites 110-1 to 110-N (i.e., the subset includes the global navigation satellites in view of the satellite navigation receiver 120). The satellite navigation receiver 120 then makes satellite navigation measurements based on the signals and calculates a state of the satellite navigation receiver 120 based on the satellite navigation measurements. In some embodiments, the state of the satellite navigation receiver includes a position of the satellite navigation receiver (e.g., X, Y, and Z, or latitude, longitude, and zenith components of position), a velocity of the satellite navigation receiver, and a time. The satellite navigation receiver 120 is described in more detail below with respect to FIG. 2.

In some embodiments, the carrier signals are received by reference stations 140-1 to 140-M at known locations (e.g., surveyed locations). The reference stations include a GNSS receiver that receives signals from the global navigation satellites 110-1 to 110-N. At any one time, the GNSS receiver receives signals only from the global navigation satellites 110 that are in view of the receiver's antenna. Reference stations 140-1 to 140-M are typically used to perform differential GPS operations and/or to track the orbits of global navigation satellites 110-1 to 110-N. In order to perform these operations, each of the reference stations 140-1 to 140-M receive signals from a subset of the global navigation satellites 110-1 to 110-N (i.e., the subset of global navigation satellites 110-1 to 110-N that are in view of each of the reference stations 140-1 to 140-M) and makes satellite navigation measurements based on the signals. In some embodiments the reference stations 140-1 to 140-M transmit the satellite navigation measurement to a computer system 130 via network 150. The reference stations 140-1 to 140-M are described in more detail below with respect to FIG. 2.

In some embodiments, computer system 130 processes the satellite navigation measurements received from reference stations 140-1 to 140-M to determine the state of global navigation satellites 110-1 to 110-N. In some embodiments, the state of the global navigation satellites includes a position of each of global navigation satellites 110-1 to 110-N (e.g., X, Y, and Z, or latitude, longitude, and zenith components of position), a velocity of each of the global navigation satellites 110-1 to 110-N, and a time. Computer system 130 then generates correction signals 132 (sometimes called aiding signals) that correct for orbital deviations of global navigation satellites 110-1 to 110-N. Note that errors in predicted orbits and clocks of global navigation satellites 110-1 to 110-N are referred to as orbital deviations in this specification. Computer system 130 sends correction signals 132 to communication satellites 160-1 to 160-P, which in turn, transmit correction signals 132 to satellite navigation receiver 120 and/or reference stations 140-1 to 140-M. Alternatively, computer system 130 sends correction signals 132 to satellite navigation receiver 120 and/or reference stations 140-1 to 140-M via a network (e.g., network 150). Computer system 130 is described in more detail below with respect to FIG. 3.

Network 150 can generally include any type of wired or wireless communication channel capable of coupling together computing nodes. This includes, but is not limited to, a local area network, a wide area network, or a combination of networks. In some embodiments, network 150 includes the Internet.

Note that there are two types of GPS measurements (i.e., satellite navigation measurements) that are usually made (e.g., by the satellite navigation receiver 120 and/or the reference stations 140-1 to 140-M): pseudorange measurements and carrier phase measurements. The operations used to determine the state of the satellite navigation receiver 120 and the operations used to determine the state of the global navigation satellites 110-1 to 110-N based on these satellite navigation measurements are well-known in the art and therefore a detailed explanation of those operations is not provided in this specification.

Figure 2:
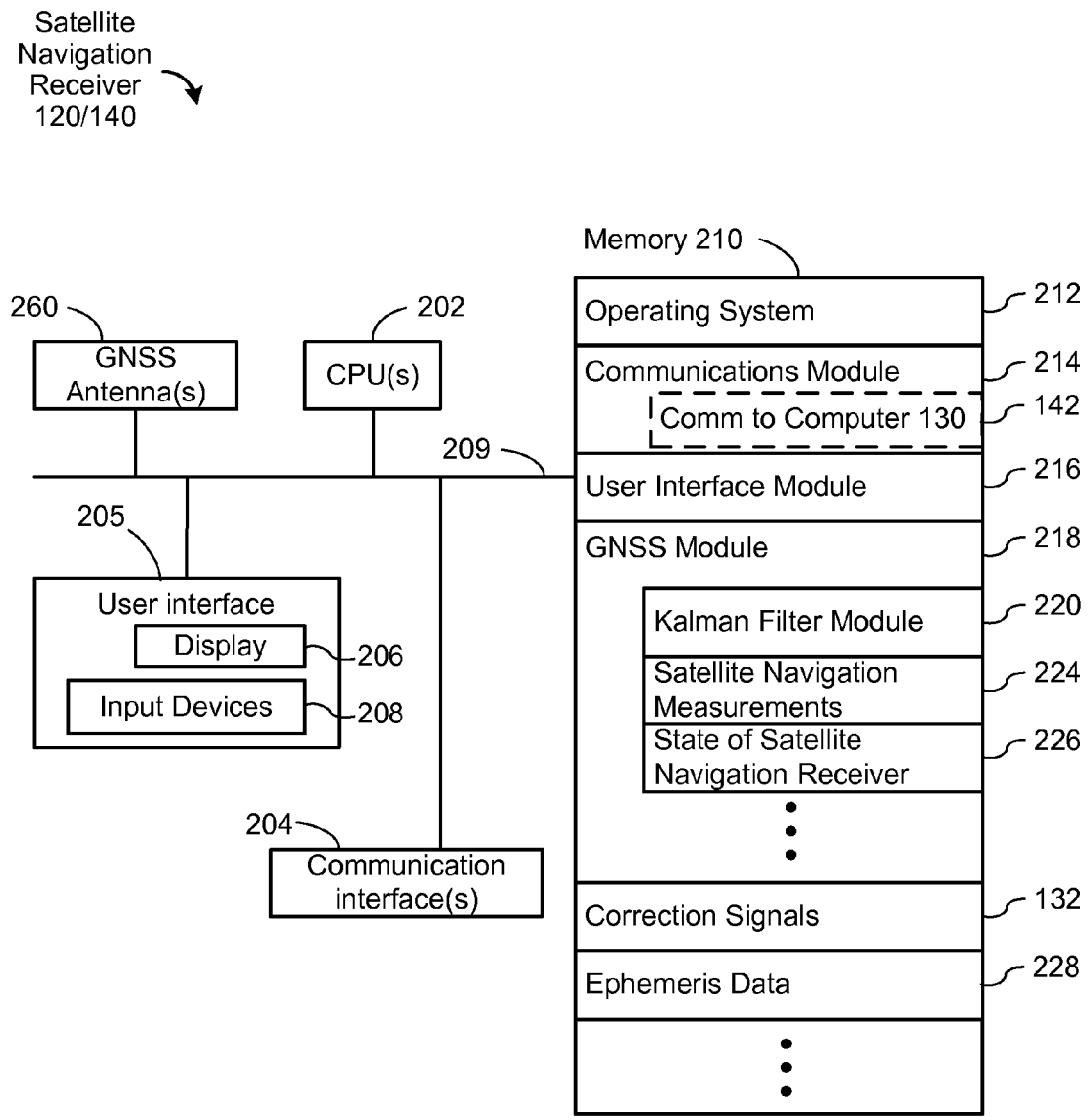
FIG. 2 is a block diagram illustrating a satellite navigation receiver, according to some embodiments.

FIG. 2 is a block diagram illustrating the satellite navigation receiver 120, according to some embodiments. This block diagram is also illustrates the reference stations 140. The satellite navigation receiver 120 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The satellite navigation receiver 120 optionally may include a user interface 205 comprising a display device 206 and one or more input devices 208 (e.g., one or more of a keyboard, mouse, touch screen, keypad, etc.). The satellite navigation receiver 120 also includes one or more GNSS antennas configured to receive signals transmitted by the global navigation satellites 110-1 to 110-N. Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a non-transitory computer readable storage medium. In some embodiments, memory 210 or the computer readable storage medium of memory 210 stores the following programs, modules and data structures, or a subset thereof:

- an operating system 212 that includes procedures for handling various basic system services and for performing hardware dependent tasks;
- a communication module 214 that is used for connecting the satellite navigation receiver 120 to other computer systems via the one or more communication interfaces 204 (wired or wireless) and one or more communication networks, such as the Internet, other wide area networks, local area networks, metropolitan area networks, and so on;
- a user interface module 216 that receives commands from the user via the input devices 208 and generates user interface objects in the display device 206;
- a GNSS module 218 that receives and processes signals from the global navigation satellites 110-1 to 110-N via one or more GNSS antennas 260, the GNSS module 218 including a Kalman filter module 220 configured to estimate a state 226 of the satellite navigation receiver 120 based on satellite navigation measurements 224 obtained from signals received from the global navigation satellites 110 in view of the receiver's antenna 260;
- ephemeris data 228, which includes a set of parameters used by the receiver 120 to predict orbits and clocks of the global navigation satellites; and
- correction signals 132 (e.g., signals received from a service that provides GNSS correction signals, as represented by system 130 in FIG. 1) for errors in the predicted orbits and clocks of the global navigation satellites 110-1 to 110-N.

In some embodiments, the correction signals 132 include corrections not only for errors in the predicted orbits (e.g., orbital position and velocity) and clocks of the satellites, but also for corrections to compensate for tropospheric effects and ionospheric effects, satellite wide lane and narrow lane fractional phase biases, and/or inter-frequency biases in the code and carrier phase measurements.

In each respective reference station 140, the communication module 214 includes instructions 142 for sending the measurements made by the respective reference station 140 to the computer system 130, via the one or more communication interfaces 204 (wired or wireless) and one or more communication networks 150, such as the Internet, other wide area networks, local area networks, metropolitan area networks, and so on. Reference stations 140 typically have a more substantial housing than mobile receivers, typically a building or other durable structure that is durably positioned at a known location.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "satellite navigation receiver," FIG. 2 is intended more as functional description of the various features which may be present in a satellite navigation receiver than as a structural schematic of the embodiments described herein. In practice, and as recognized by those of ordinary skill in the art, items shown separately could be combined and some items could be separated.

In some embodiments, each of the reference stations 140-1 to 140-M includes a satellite navigation receiver that includes components and modules as described with respect to FIG. 2.

Figure 3:
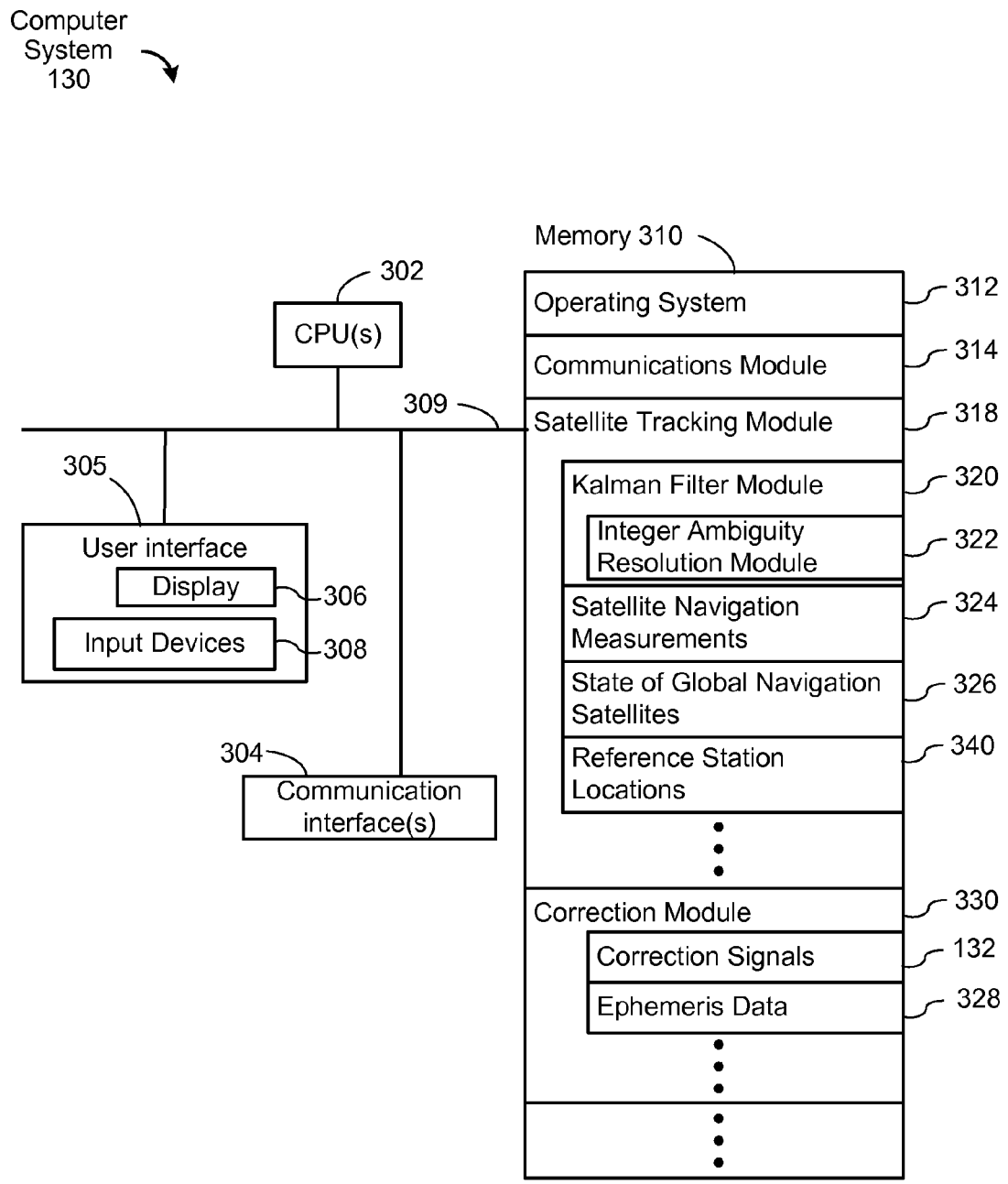
FIG. 3 is a block diagram illustrating a computer system, according to some embodiments.

FIG. 3 is a block diagram illustrating computer system 130, according to some embodiments. Computer system 130 typically includes one or more processing units (CPU's) 302, one or more network or other communications interfaces 304 (e.g., to communicate with reference stations 140 and communications satellites 160, FIG. 1), memory 310, and one or more communication buses 309 for interconnecting these components. The communication buses 309 may include circuitry (sometimes called a chipset) that interconnects and controls communications between system components.

Figure 4:
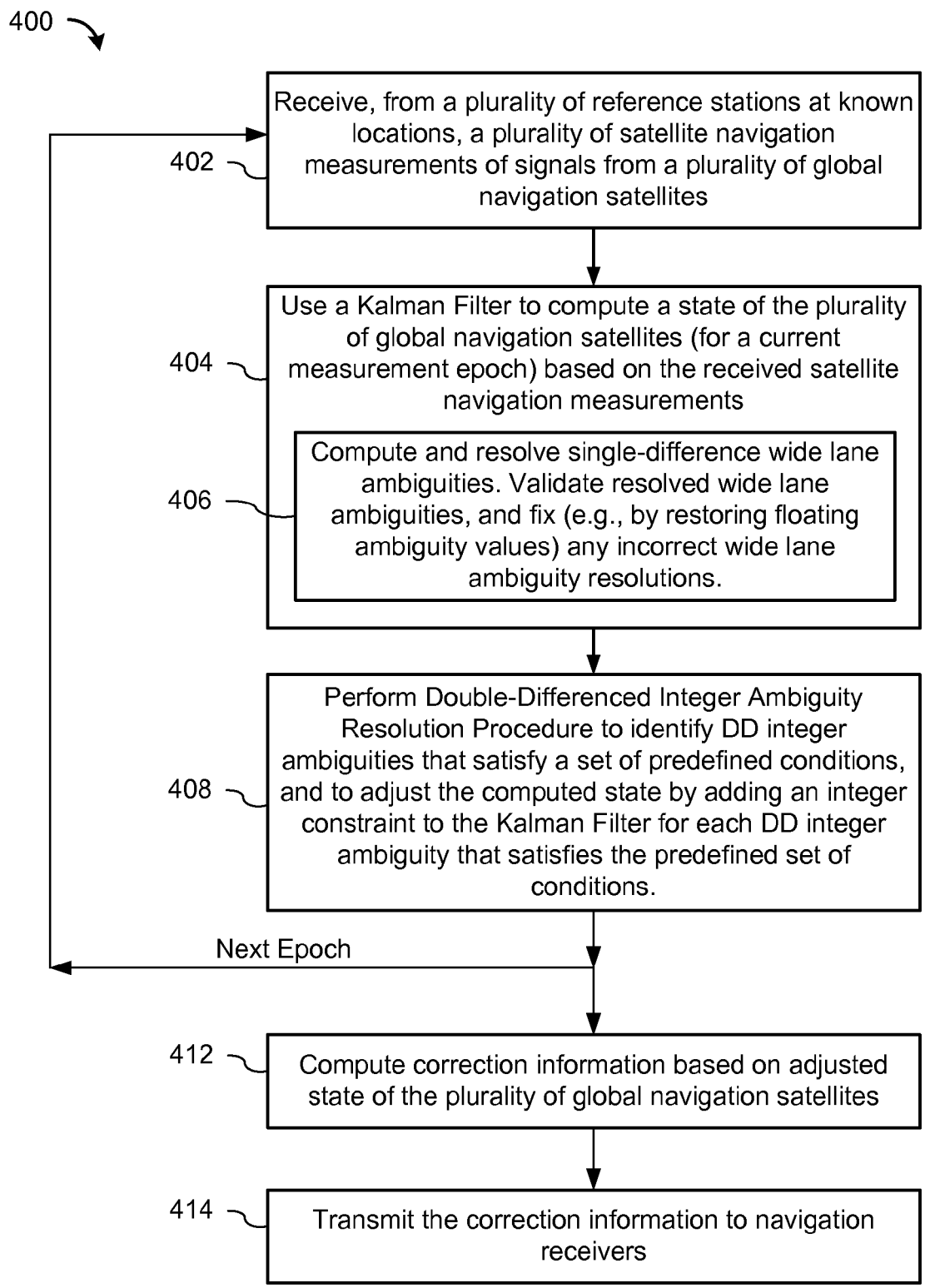
FIG. 4 is a flowchart of a method for computing an estimated state of a plurality of global navigation satellites, and for adjusting the computed estimated state by applying constraints on one or more double-differenced integer ambiguities that satisfy predefined criteria, according to some embodiments.

Computer system 130 optionally may include a user interface 305 comprising a display device 306 and one or more input devices 308 (e.g., one or more of a keyboard, mouse, touch screen, keypad, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310, or alternately the non-volatile memory device(s) within memory 310, comprises a non-transitory computer readable storage medium. In some embodiments, memory 310 or the computer readable storage medium of memory 310 stores the following programs, modules and data structures, or a subset thereof:

- an operating system 312 that includes procedures for handling various basic system services and for performing hardware dependent tasks;
- a communication module 314 that is used for connecting computer system 130 to other computer systems via the one or more communication interfaces 304 (wired or wireless) and one or more communication networks (e.g., the network 150 of FIG. 1), such as the Internet, other wide area networks, local area networks, metropolitan area networks, or a combination of such networks;
- a satellite tracking module 318 that receives and processes signals from global navigation satellites 110-1 to 110-N via reference stations 140-1 to 140-M, the satellite tracking module 318 including a Kalman filter module 320 configured to estimate a state 326 of global navigation satellites 110-1 to 110-N based on satellite navigation measurements 324 obtained from a set of reference stations 140 (FIG. 1), and an integer ambiguity resolution measurement module 322 that determines when a predefined condition has been met, and then modifies the Kalman filter update process to apply a predefined constraint with respect to one or more double difference integer ambiguities when updating the Kalman filter state, as described in more detail below with respect to FIGS. 4-5;
- ephemeris data 328, which includes a set of parameters used by computer system 130 to predict orbits and clocks of the global navigation satellites;
- reference station position information 340, which specifies the surveyed, known positions of the reference stations 140 (FIG. 1); and
- a correction module 330 that uses the state 326 of the global navigation satellites 110-1 to 110-N to generate the correction signals 132 that correct for orbital deviations (i.e., errors in the predicted orbits and clocks) of the global navigation satellites 110-1 to 110-N relative to the predicted orbits and clocks broadcast from the satellites.

As noted in the description of the satellite navigation receiver 120 (FIG. 2), the satellite navigation measurements 324 obtained from a set of reference stations 140 are based on signals received by the reference stations from the global navigation satellites 110-1 to 110-N. Also as noted above, the correction signals 132 generated by the correction module may include corrections that compensate for additional sources of navigation signal errors, in addition to errors in the predicted orbits and clocks of the global navigation satellites 110, such as tropospheric effects and ionospheric effects, satellite wide lane and narrow lane fractional phase biases, and/or inter-frequency biases in the code and carrier phase measurements.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 310 may store a subset of the modules and data structures identified above. Furthermore, memory 310 may store additional modules and data structures not described above.

Although FIG. 3 shows a "computer system," FIG. 3 is intended more as functional description of the various features which may be present in a set of computer systems than as a structural schematic of the embodiments described herein. In practice, and as recognized by those of ordinary skill in the art, items shown separately could be combined and some items could be separated. For example, some items shown separately in FIG. 3 could be implemented on single computer systems and single items could be implemented by one or more computer systems. The actual number of computer systems and how features are allocated among them will vary from one implementation to another, and may depend in part on the amount of data traffic that the system must handle during peak usage periods as well as during average usage periods.

Determine a State for a Plurality of Global Navigation Satellites Using Standard Kalman Filter Estimation Before proceeding with the discussion on applying, in state update computations performed by a Kalman filter, constraints on double differenced ambiguity values, so as to generate an improved Kalman state from which correction information is generated, it is instructive to discuss a standard Kalman filter implementation. Note that a Kalman filter, as used in this specification, includes standard Kalman filters, as well as extended and modified Kalman filters. The embodiments described herein can be applied to any of these types of Kalman filters. Kalman filters have two phases of computation for each measurement epoch: a prediction phase and an update phase. In addition, a Kalman filter generally predicts and updates both an estimated state of the device or system being tracked by the Kalman filter, and a predicted estimate covariance (often simply called the covariance or estimate covariance), representing the estimated accuracy of the computed state.

The Kalman filter is typically a procedure (or module), or set of procedures (or modules), executed by one or more processors. The Kalman filter is executed repeatedly (e.g., once per second), each time using new code measurements (also called pseudorange measurements) and carrier phase measurements, to update the Kalman filter state. While the equations used by Kalman filters are complex, Kalman filters are widely used in the field of navigation, and therefore only those aspects of the Kalman filters that are relevant to the present invention need to be discussed in any detail. It should be emphasized that while Kalman filters are widely used in GPS receivers and other navigation systems, many aspects of those Kalman filters will vary from one implementation to another. For instance, the Kalman filters used in some GPS receivers may include states that are not included in other Kalman filters, or may use somewhat different equations than those used in other Kalman filters.

Let sets of satellite navigation measurements taken in time sequence be denoted as $L_1, L_2, \ldots, L_n$, where the subscript denotes the time at which the satellite navigation measurement is taken and where each satellite navigation measurement set is defined as a measurement vector. The unknown state vectors at each measurement epoch are denoted as $X_1, X_2, \ldots, X_n$, respectively.

The relationship between the expected value of the satellite navigation measurements as a function of the unknown state parameters can be described as $E(L_k)=F(X_k)$. The difference between the satellite navigation measurements and their expected value, sometimes referred to as the pre-fix residuals, is designated as Z. The linear observational model whose norm (i.e., length) is to be minimized is given by:

$$V_k = H\delta X_k^+ - (L_k - f(X_k^-)) = H\delta X_k^+ - Z \qquad (A)$$

where $V_k$ is the residual vector (i.e., post measurement update), $X_k^-$ is the state vector parameters before the measurement update, H is the sensitivity of the satellite navigation measurements to the unknown state parameters (partial derivatives of $f(X_k^-)$ with respect to the state vector parameters), $\delta X_k^+$ is the correction to the state vector which minimizes the norm of the residual vector.

In standard Kalman filter processing the satellite navigation measurements are assumed to have a noise, $\epsilon$, that is uncorrelated between measurement epochs. In addition, the individual satellite navigation measurements at a specific measurement epoch also are assumed to be uncorrelated. Note that when the satellite navigation measurements are correlated, it is often possible to remove the correlation in a preprocessing step. The covariance matrix for a given measurement epoch is defined by the diagonal matrix R:

$$\text{Cov}(\varepsilon_i, \varepsilon_j) = R = \begin{cases} r_i & i = j \\ 0 & i \neq j \end{cases} \qquad (B)$$

where $r_i$ is the $i^{th}$ diagonal element of the covariance matrix R, representing the covariance of the $i^{th}$ satellite navigation measurement.

In some forms of the Kalman filter implementation, the inverse of the R matrix is used instead of R. The inverse of R is also referred to as the weight matrix W in which the elements $w_i$ of W are simply the inverse of the individual elements of R (i.e., $w_i = 1/r_i$).

The relationship between sequential epoch's of the vector $X_1, X_2, \ldots, X_n$ is established statistically as:

$$X_k = \phi_{k,k-1} X_{k-1} + U_k \qquad (C)$$

where $X_k$ is the unknown state vector at epoch k, $\phi_{k,k-1}$ is a matrix (also called the transition matrix) that relates $X_{k-1}$ to $X_k$, and $U_k$ is a vector whose elements are a white noise sequence (i.e., a sequence of zero mean random values that are uncorrelated).

The covariance matrix associated with $U_k$ is assumed to be known and is denoted as:

$$Q_k = \text{Cov}[U_k U_j^T] = \begin{cases} Q_k & j = k \\ 0 & j \neq k \end{cases} \qquad (D)$$

where $U_j^T$ is the transpose of $U_j$, which is the same as the non-transpose of $U_j$ because $U_j$ is a diagonal matrix.

The Kalman filter estimate of the state after k−1 epochs is $X_{k-1}^+$ with a corresponding covariance of $P_{k-1}^+$. The predicted state and corresponding covariance matrix at the next epoch, k, is:

$$X_k^- = \phi_{k,k-1} X_{k-1}^+ \qquad (E)$$

$$P_k^- = \phi_{k,k-1} P_{k-1}^+ \phi_{k,k-1}^T + Q_k \qquad (F)$$

where: $X_{k-1}^+$ and $P_{k-1}^+$ are Kalman filter estimated states and variance, respectively, for the k−1 epoch, $\phi_{k,k-1}$ and $Q_k$ are Kalman filter state transition and dynamic matrices, respectively, between k−1 and k epochs, and $X_k^-$ and $P_k^-$ are Kalman filter predicted states and variance, respectively, for epoch k. The Kalman filter estimated state and variance are sometimes called the state and variance (or the calculated state and variance) of the object or system whose state is being tracked by the Kalman filter.

In order to update the results using the measurement vector at epoch k (the observation equation) the following formulas are used. The Kalman gain matrix, K, is $$K = P_k^- H^T (H P_k^- H^T + R)^{-1} \qquad (G)$$

The state (parameter) vector measurement update, $X_k^+$, also called the Kalman filter estimated state or the computed state of the object or system, is $$X_k^+ = X_k^- + KZ \qquad (H)$$

The covariance matrix measurement update, $P_k^+$, also called the Kalman filter estimated covariance or the computed covariance of the object or system, is $$P_k^+ = (I - KH) P_k^- \qquad (I)$$

where I is the identity matrix.

The process described above with respect to equations (A) to (I) may be used to determine a state of a plurality of global navigation satellites (e.g., to track the orbits of the satellites), as described below with respect to FIG. 4.

Double Difference Ambiguity Values and Constraints on Double Difference Ambiguity Values Precise orbit and clock determination to 3-5 centimeter accuracy for Global navigation Satellite Systems (GNSS) requires carrier phase ambiguities to be correctly resolved. Because satellite and receiver dependent biases exist, ambiguity resolution on non-differential carrier phase measurements is challenging.

This document describes a new approach for resolving carrier phase ambiguities, using double differenced integer ambiguities and applying constraint on the double differenced integer ambiguities when updating the state of a Kalman filter. The Kalman filter state represents positions, trajectories and clock values of global navigation satellites 110-1 to 110-N (FIG. 1).

Carrier phase ambiguities are ambiguities in the measured distance between a satellite and a receiver. These are often called integer ambiguities, because the correct value of the ambiguity is an integer that is multiplied by the applicable wavelength. The sum of the measured carrier phase and the resolved integer ambiguity value, multiplied by the applicable wavelength, equals the distance between the satellite and the receiver. The integer ambiguity is measured in "cycles," as are values such as the fractional difference between floating and integer values of a respective integer ambiguity, and the standard deviation (also called the sigma) of the integer ambiguity.

The basic observable for the precise GNSS satellite orbit and clock determination of a respective satellite is a zero-differenced ionosphere-free linear combination (LC) of L1/L2 carrier phases, shown in equations (3) and (4), below.

The first order ionospheric delay in the original observable is eliminated by the linear combination of dual-frequency carrier phases. The wide lane ambiguities can be resolved using the Melbournce-Wubbena combination shown in equations (1) and (2).

The wide lane ambiguity can be computed for each satellite (without differencing across satellites or receivers) using the Melbourne-Wubbena equation, shown in equation (1). The wide lane ambiguity is computed by subtracting the wide lane phase from the narrow lane pseudo range observations as in equation (1)

$$\frac{f_1}{f_1+f_2}P_1 + \frac{f_2}{f_1+f_2}P_2 - \left(\frac{f_1}{f_1-f_2}\Phi_1\lambda_1 - \frac{f_2}{f_1-f_2}\Phi_2\lambda_2\right) = \qquad (1)$$
$$\frac{c}{f_1-f_2}(N_1^i - N_2^i + B_W^i)$$

Solving this equation for the wide lane ambiguity and bias results in Equation (2)

$$N_W^i + B_W^i = \frac{(f_1-f_2)}{(f_1+f_2)\lambda_1}P_1 + \frac{(f_1-f_2)}{(f_1+f_2)\lambda_2}P_2 - (\Phi_1 - \Phi_2) \qquad (2)$$
$$= K_1 P_1 + K_2 P_2 - (\Phi_1 - \Phi_2)$$

where:
$P_1$, $P_2$ are pseudorange measurements in meters on the GNSS $f_1$, $f_2$ frequencies respectively;
$\lambda_1$, $\lambda_2$ are the wavelengths in meters for the GNSS $f_1$, $f_2$ frequencies respectively;
$\Phi_1$, $\Phi_2$ are the carrier phase measurements in cycles on the GNSS $f_1$, $f_2$ frequencies respectively;
c is the speed of light (m/s);
$N_1^i$, $N_2^i$ are the integer ambiguities for satellite i on the GNSS $f_1$, $f_2$ frequencies respectively;
$B_W^i$ is the wide lane bias in cycles which depends upon both satellite and receiver.
$N_W^i = N_1^i - N_2^i$ is the wide lane ambiguity in cycles for the satellite i $$K_1 = \frac{(f_1-f_2)}{(f_1+f_2)\lambda_1}$$
$$K_2 = \frac{(f_1-f_2)}{(f_1+f_2)\lambda_2}$$

Undifferenced Ionospheric Refraction-Free Linear Combination

The undifferenced ionospheric refraction-free linear combination of the L1/L2 carrier phase measurements can be expressed as in equation (3):

$$L_3^i = \frac{f_1^2}{f_1^2-f_2^2}\Phi_1\lambda_1 - \frac{f_2^2}{f_1^2-f_2^2}\Phi_2\lambda_2 \qquad (3)$$
$$= \rho + \tau_r + \tau^i + T + AMB_{L3}^i$$

Where:
$\rho$ is the geometric distance between the satellite phase center and the receiver refraction corrected phase center including satellite orbital error, receiver displacement etc.;
$\tau_r$ is the receiver clock error;
$\tau^i$ is the satellite clock error;
T is tropospheric delay (m); and
$AMB_{L3}^i$ is the carrier phase bias, measured in meters, of an ionospheric refraction-free linear combination of the integer ambiguities for two signals having different wavelengths (e.g., L1 and L2) from the same satellite.

This ambiguity term can take several forms, as shown in equation (4):

$$AMB_{L3}^i = \frac{f_1^2}{f_1^2-f_2^2}N_1^i\lambda_1 - \frac{f_2^2}{f_1^2-f_2^2}N_2^i\lambda_2 \qquad (4)$$
$$= \lambda_{nl}\left(N_1^i + \frac{f_2}{f_1-f_2}N_W^i\right)$$
$$= \lambda_{nl}\left(N_2^i + \frac{f_1}{f_1-f_2}N_W^i\right)$$
$$= \frac{N_W^i}{2}\lambda_W + \frac{N_{nl}^i}{2}\lambda_{nl}$$

Where:

$$\lambda_{nl} = \frac{c}{f_1+f_2}$$

is the narrow lane wavelength, typically having a value of approximately 10.7 cm;

$$\lambda_W = \frac{c}{f_1-f_2}$$

is the wide lane wavelength, typically having a value of approximately 86.4 cm;
$N_{nl}^i = N_1^i + N_2^i$ is the combined narrow lane ambiguity; and
$N_W^i = N_1^i - N_2^i$ is the wide lane ambiguity.

The ambiguities can be resolved in two steps. The first step is wide-lane ambiguity resolution using equations (1) and (2). The details are discussed below ("Single-Differenced Wide Lane Ambiguity Resolution"). The second step is the narrow-lane ambiguity resolution. It is computed by inserting the resolved integer wide-lane ambiguity into equation (4). This narrow lane ambiguity, which is resolved in the second step, can be the integer ambiguity value associated with either the L1 or the L2 frequency, or the narrow lane combination of both the L1 and L2 frequencies. The effective narrow lane ambiguity wavelength is about 10.7 cm, independent of which of the narrow lane ambiguities are resolved. This narrow lane wavelength is easily computed for either the L1 or the L2 ambiguity using equation (4). If the narrow lane combination of both the L1 and L2 frequencies is used, the explicit ambiguity wavelength is only one-half as big. However, since the combined narrow lane ambiguity has the same odd-even integer characteristic as the wide lane ambiguity, the same the effective wavelength (10.7 cm) results for the combined narrow lane due to the odd-even constraint.

Single-Difference Wide Lane Ambiguity Resolution

The wide lane fractional bias term $B_W^i$ which appears in equations (1) and (2), is called the wide lane bias (in cycles) and depends upon both the satellite and the receiver. By forming the single difference of equation (2) between two satellites from the same constellation (e.g., GPS, GLONASS or Galileo) at one receiver site, the receiver dependent component of the wide lane bias can be cancelled out. The remaining wide lane bias part contains the single difference wide lane bias between satellites.

There are two options for computing wide lane fractional biases. They can either be pre-computed for each day in a batch mode or they can be estimated in real time for each epoch during the wide lane ambiguity resolution process. The latter option is typically preferred, because it can be performed concurrently as the single differenced wide lane ambiguities are being resolved.

Satellite Wide Lane Bias Computation

A Kalman Filter approach is used to estimate all the satellite biases for the wide lane ambiguity resolution. One bias state for each satellite is required. The single difference of equations (1) and (2) between satellites is used to estimate each satellite bias during the wide lane ambiguity resolution process. The computation procedure involves the following steps:

1. Initialize the Kalman filter using large variance (e.g., 0.5 cycles squared) and zero for the filter state of each satellite wide lane bias in a constellation (e.g., GPS, GLONASS or Galileo) of navigation satellites. If satellites from multiple constellations are being tracked, initialize the filter state of each satellite wide lane bias in each constellation.
2. At each epoch, compute the CMC (code minus carrier) term (i.e., the narrow lane code measurement minus the wide lane carrier phase measurement) as given in equations (1) and (2) using each of the code and carrier phase measurements at each site.
3. Smooth the CMC term using a low pass filter and reset the filter if a carrier cycle slip or large change in value is detected.
4. Select a high elevation reference satellite for each site and each constellation.
5. Form single difference of each smoothed CMC by subtracting from each the smoothed value of the CMC for the selected reference satellite.
6. Round off the single differenced CMC value for each satellite.
7. Update each bias state and variance matrix using the differenced fractional CMC measurement (i.e., the amount of the round off) for each site.
8. Apply the constraint of a zero mean of all satellites biases for each constellation as additional virtual measurements into Kalman filter for the wide lane ambiguity biases.
9. Perform the Kalman filter time update for the satellite wide lane biases after the fractional CMC measurements update for all sites is completed.
10. At each epoch repeat steps 2 through 9.

The real-time bias computation module is designed and implemented to automatically compute satellite wide lane biases at a specific bias update interval. The satellite wide lane bias will be flagged as ready to be used after data for a specified time period (e.g., 4 to 6 hours) has been processed. In some circumstances, such as when all the navigation satellites are functioning properly, all the wide-lane biases are treated as ready to be used after the Kalman filter has been active (e.g., since the last time it was restarted or initialized) for at least six hours. When the satellite biases from the real-time Kalman filter estimation are ready, the wide lane integer ambiguity resolution process will start.

Single-Difference Wide Lane Ambiguity Resolution

The single difference wide lane ambiguity resolution process consists of several real time steps which include; 1) reference satellite selection and switching logic, 2) computation of the single difference wide lane ambiguities and associated statistics, 3) ambiguity validation and incorrect fix recovery, and 4) the satellite wide lane bias estimation.

The computation of single difference wide lane ambiguities for each satellite at each site (i.e., each reference station) and the associated statistics includes:

compute the CMC value (narrow lane code minus wide lane carrier) and its variance as a function of elevation and smoothing time;

perform the Kalman Filter measurement update of the floating ambiguity (WL_float) and its sigma value (WL_float_sigma);

subtract the fractional wide lane bias (WL_bias) from the floating ambiguity (WL_float) and round to the nearest integer as the potential fixed integer value;

compute the residual by subtracting the WL bias and the integer from the floating ambiguity; and perform the Kalman filter update of ambiguity residual (WL_res) and its sigma (WL_res_sigma).

In some embodiments, the ambiguity validation and wrong fixed integer recovery procedure is as follows. The ambiguity is resolved or fails (WL_fix) when the following criteria are satisfied:

The float ambiguity variance (WL_float_sigma) should be within a specified threshold, (e.g., 0.1 cycle);

given a confidence level, (e.g., 99.7%), the residual (WL_res) should be within the associated multiple (e.g., 3) of the one sigma value of the float ambiguity (WL_float_sigma) as defined by a normal distribution (e.g., the residual, WL_res, should be less than 3 times WL_float_sigma); and the standard deviation (sometimes called the sigma) of the residual (WL_res_sigma) should be within a threshold value, (e.g., 0.25 cycles).

Ambiguity fixes (within a sliding time interval window) are identified as incorrectly fixed to an integer if the standard deviation of the residuals (within that sliding window) is over a threshold value, (e.g., 0.25 cycles).

When it is determined the WL fix criteria has not been met, the Flag WL_fix is set to (wrong_fix) and the wide lane ambiguity as a floating value is restored.

A pseudo-code representation of the wide lane ambiguity resolution process is shown in Table 1, below.

TABLE 1

Wide Lane Ambiguity Process Flow

Repeat for Each Epoch {
    Repeat for each reference station {
        Select Reference Satellite (e.g., the highest elevation satellite);
        Record measurement data;
        For each satellite in view{
            Perform Wide Lane single-differenced integer ambiguity
            resolution;
            Perform ambiguity validation and wrong fixed integer
            recovery;
        }
    }
    Update Wide Lane Biases in Kalman Filter
}

Double-Difference (DD) Narrow Lane Ambiguity Resolution

As both satellite and receiver dependent biases exist, the narrow lane ambiguity is not an integer. However the double differenced (DD) narrow lane ambiguity between receiver and satellite has an integer characteristic (i.e., has an integer value) after the fixed single-difference wide lane ambiguities are inserted into equation (4).

DD Ambiguity Integer Constraint Concept

The equations shown below are used to describe how a single double-differenced (DD) ambiguity integer constraint is implemented within the Kalman filter (which is used to determine the orbital state of a plurality of satellites). Additional independent ambiguity constraints can be implemented during the same Kalman filter processing epoch, or at different epochs. No loss of generality occurs by dropping the subscripts in equation (4) for the specific assumed narrow lane or narrow lane combination and instead using the subscript to indicate the specific receiver (i.e., reference station) involved. Thus, the narrow lane ambiguities in equation (4) for two specific receivers can be indicated with subscripts A and B. Thus the narrow lane floating ambiguities can be indicated by $\hat{N}_A^i, \hat{N}_A^j, \hat{N}_B^i, \hat{N}_B^j$ for the two receivers in equation (4) and their variance and covariance by $q_{A_i,A_i}$ for satellites i, j and reference stations A, B respectively. These values can easily be obtained from the Kalman filter state vector and variance-covariance matrix after the measurement update to the Kalman filter. The computation of the DD floating ambiguity $\Delta\nabla\hat{N}_{A,B}^{i,j}$ and variance $Q_{\Delta\nabla\hat{N}_{A,B}^{i,j}}$ is computed using equations (5) and (6).

$$\Delta\nabla\hat{N}_{A,B}^{i,j} = \hat{N}_A^i - \hat{N}_A^j - \hat{N}_B^i + \hat{N}_B^j \quad (5)$$

$$Q_{\Delta\nabla\hat{N}_{A,B}^{i,j}} = (1 \quad -1 \quad -1 \quad 1)$$

$$\begin{pmatrix} q_{A_i,A_i} & q_{A_i,A_j} & q_{A_i,B_i} & q_{A_i,B_j} \\ q_{A_j,A_i} & q_{A_j,A_j} & q_{A_j,B_i} & q_{A_j,B_j} \\ q_{B_i,A_i} & q_{B_i,A_j} & q_{B_i,B_i} & q_{B_i,B_j} \\ q_{B_j,A_i} & q_{B_j,A_j} & q_{B_j,B_i} & q_{B_j,B_j} \end{pmatrix} \begin{pmatrix} 1 \\ -1 \\ -1 \\ 1 \end{pmatrix}$$

$$= q_{A_i,A_i} - q_{A_j,A_i} - q_{B_i,A_i} + q_{B_j,A_i} -$$
$$q_{A_i,A_j} + q_{A_j,A_j} + q_{B_i,A_j} - q_{B_j,A_j} -$$
$$q_{A_i,B_i} + q_{A_j,B_i} + q_{B_i,B_i} - q_{B_j,B_i} +$$
$$q_{A_i,B_j} - q_{A_j,B_j} - q_{B_i,B_j} + q_{B_j,B_j}$$
$$= q_{A_i,A_i} + q_{A_j,A_j} + q_{B_i,B_i} + q_{B_j,B_j} -$$
$$2q_{A_j,A_i} - 2q_{B_i,A_i} + 2q_{B_j,A_i} + 2q_{B_i,A_j} -$$
$$2q_{B_j,A_j} - 2q_{B_j,B_i} \quad (6)$$

Setting a flag to indicate successful ambiguity resolution should be made based upon a number of factors. The probability of success is, among other factors, a function of the selected thresholds. It is also a function of the filtering time (which should be as short as possible without causing the rate of incorrect ambiguity resolution to be excessive). The final probability of success is strongly dependent upon the thresholds chosen 1) for the allowable residual fraction by which the floating ambiguity differs from an integer value, 2) the allowable sigma value of the floating ambiguity, and the minimum filtering time. The probability of successful ambiguity resolution can be derived in theory as a pure function of the floating ambiguity and its variance, which are a function of the filtering time. It should be noted that redundant ambiguity pairs can arise because the ambiguity pairs of satellites or sites can form chains of links which can become redundant. The fixing of redundant ambiguity pairs should be avoided. It is easy to determine whether or not a derived floating DD ambiguity is already an integer since its computed variance will be zero, assuming there is no numerical computational error. In practice, a very small epsilon value can be used as a check that the variance is very near zero.

If the decision is made that $\Delta\nabla\hat{N}_{A,B}^{i,j}$ can be fixed to $\Delta\nabla N_{A,B}^{i,j}$=roundoff($\Delta\nabla\hat{N}_{A,B}^{i,j}$), where roundoff(x) is equal to the integer closest in value to x, then the DD integer ambiguity constraint is introduced into the Kalman filter state and variance matrix.

This is accomplished by introducing virtual measurements with associated variance-covariance matrix into the Kalman filter. Multiple floating and/or fixed constraints can be imposed in the same virtual measurement. The state vector and associated variance-covariance matrix for the individual ambiguities is as shown in equation (7).

$$X^0 = \begin{pmatrix} \hat{N}_A^i \\ \hat{N}_A^j \\ \hat{N}_B^i \\ \hat{N}_B^j \\ \hat{X}_{other} \end{pmatrix} \text{ and} \quad (7)$$

$$Q_{X^0} = \begin{pmatrix} q_{A_i,A_i} & q_{A_i,A_j} & q_{A_i,B_i} & q_{A_i,B_j} & \cdots \\ q_{A_j,A_i} & q_{A_j,A_j} & q_{A_j,B_i} & q_{A_j,B_j} & \cdots \\ q_{B_i,A_i} & q_{B_i,A_j} & q_{B_i,B_i} & q_{B_i,B_j} & \cdots \\ q_{B_j,A_i} & q_{B_j,A_j} & q_{B_j,B_i} & q_{B_j,B_j} & \cdots \\ \cdots & \cdots & & & \end{pmatrix}$$

The specific new constraint imposed on the Kalman filter to force the floating double differenced $\Delta\nabla\hat{N}_{A,B}^{i,j}$ ambiguity to be an integer (or near integer) is:

$$C\delta X = W$$

where $$C = (0 \ 1 \ -1 \ -1 \ 1 \ 0) \quad (8)$$

In equation (8), $\delta X$ is the state correction vector arising from the imposition of the DD integer constraint. Stated another way, $\delta X$ is the state update corresponding to one double-differenced integer ambiguity constraint being used by the Kalman filter. The value of W in equation (8) is referred to as the misclosure and is defined as the difference between the rounded value of the floating double difference ambiguity minus the unrounded value, $\Delta\nabla\hat{N}_{A,B}^{i,j}$. Specifically W is computed as given in equation (9).

$$W = \text{roundoff}(\Delta\nabla\hat{N}_{A,B}^{i,j}) - \Delta\nabla\hat{N}_{A,B}^{i,j} \quad (9)$$

Alternatively, the misclosure, W, can be defined as, $W = \Delta\nabla N_{A,B}^{i,j} - \Delta\nabla\hat{N}_{A,B}^{i,j}$, which is the difference the fixed integer ambiguity and the floating ambiguity.

Considering equations (7) and (8), the following observation equation for virtual measurements can be written as equation (10).

$$X^0 + V = X^0 + \delta X$$

with $P = Q_{X^0}^{-1}$, $$V = \delta X + 2K^T(C\delta X - W)^T \quad (10)$$

where P is called the weight matrix, an inverse of the variance-covariance matrix; V is the post-fit residual; T is the transpose operator, and K is a linked singular coefficient (defined below) if only a single DD integer ambiguity is introduced during one Kalman filter update iteration, and is a vector if multiple DD ambiguities are introduced at the same Kalman filter update iteration. The general least-squares solution to equation (10), considering the double differencing ambiguity constraint is designed to minimize $V^T PV$, as represented by equation (11).

$$\frac{\partial (V^T PV)}{\partial \delta X} = 2V^T P \frac{\partial V}{\partial \delta X} + 2K^T \frac{\partial (C\delta X - W)^T}{\partial \delta X} \quad (11)$$
$$= 2V^T P + 2K^T C$$
$$= 0$$

Considering equation (8) and substituting equation (10) into Equation (11) yields the following equations (12) and (13):

$$P\delta X + C^T K = 0 \quad (12)$$

$$C\delta X = W \quad (13)$$

Since P is full rank matrix, equation (12) can be re-arranged as equation (14).

$$\delta X = -P^{-1} C^T K \quad (14)$$

Substituting equation (14) into equation (13) gives equation (15):

$$K = -(CP^{-1}C^T)^{-1} W \quad (15)$$

Substituting equation (15) into equation (12) yields the following:

$$\delta X = P^{-1} C^T (CP^{-1}C^T)^{-1} W \quad (16)$$
$$= Q_{X^0} C^T (CQ_{X^0} C^T)^{-1} W$$
$$= \frac{M^T}{Q_{\Delta \nabla \hat{N}_{A,B}^{i,j}}} W$$

where $Q_{\Delta \nabla \hat{N}_{A,B}^{i,j}} = CQ_{X^0} C^T$, which can be easily verified (e.g., see equation (6), above), and M is the double differenced covariance matrix, defined as in equation (17).

$$M = CQ_{X^0} \quad (17)$$
$$= (\ldots \ 0 \ 1 \ -1 \ -1 \ 1 \ 0 \ \ldots) Q_{X^0}$$
$$= \begin{pmatrix} q_{1,A_i} - q_{1,A_j} - q_{1,B_i} + q_{1,B_j} \\ q_{2,A_i} - q_{2,A_j} - q_{2,B_i} + q_{2,B_j} \\ \vdots \\ q_{n-1,A_i} - q_{n-1,A_j} - q_{n-1,B_i} + q_{n-1,B_j} \\ q_{n,A_i} - q_{n,A_j} - q_{n,B_i} + q_{n,B_j} \end{pmatrix}$$

Based on equations (12) and (13), it can be shown that the variance matrix for $$K \text{ and } \delta X \text{ is } \begin{pmatrix} P & C^T \\ C & 0 \end{pmatrix}^{-1}$$

By using formulas of sub-matrix inversion, the variance of the estimated state vector after introducing a DD integer ambiguity constraint can be derived as Equation (18)

$$Q_{\hat{X}} = \left( Q_{X^0} - \frac{M^T M}{Q_{\Delta \nabla \hat{N}_{A,B}^{i,j}}} \right) \quad (18)$$

Based on the above, the existing Kalman filter can be modified by using equations (16) and (18) to introduce the DD ambiguity constraint into the filter update computation. After the Kalman filter state is updated in accordance with equations (16) and (18), the misclosure ($W = \Delta \nabla N_{A,B}^{i,j} - \Delta \nabla \hat{N}_{A,B}^{i,j}$) between the floating ambiguity and the fixed integer ambiguity is either equal to 0, or close to zero (defined here to mean that the misclosure has been reduced in magnitude to less than a predefined threshold value, such as 0.05 cycles). It should be noted that the estimation of all state parameters is improved after one or more DD ambiguity constraints are applied.

After the DD integer ambiguity constraint is applied, the state corrections for the narrow lane ambiguities, $\hat{N}_A^i$, $\hat{N}_A^j$, $\hat{N}_B^i$, $\hat{N}_B^j$ can be derived as shown in equations (19) through (22).

$$\delta X_A^i = (q_{A_i,A_i} - q_{A_i,A_j} - q_{A_i,B_i} + q_{A_i,B_j}) \frac{\Delta \nabla N_{A,B}^{i,j} - \Delta \nabla \hat{N}_{A,B}^{i,j}}{Q_{\Delta \nabla \hat{N}_{A,B}^{i,j}}} \quad (19)$$

$$\delta X_A^j = (q_{A_j,A_i} - q_{A_j,A_j} - q_{A_j,B_i} + q_{A_j,B_j}) \frac{\Delta \nabla N_{A,B}^{i,j} - \Delta \nabla \hat{N}_{A,B}^{i,j}}{Q_{\Delta \nabla \hat{N}_{A,B}^{i,j}}} \quad (20)$$

$$\delta X_B^i = (q_{B_i,A_i} - q_{B_i,A_j} - q_{B_i,B_i} + q_{B_i,B_j}) \frac{\Delta \nabla N_{A,B}^{i,j} - \Delta \nabla \hat{N}_{A,B}^{i,j}}{Q_{\Delta \nabla \hat{N}_{A,B}^{i,j}}} \quad (21)$$

$$\delta X_B^j = (q_{B_j,A_i} - q_{B_j,A_j} - q_{B_j,B_i} + q_{B_j,B_j}) \frac{\Delta \nabla N_{A,B}^{i,j} - \Delta \nabla \hat{N}_{A,B}^{i,j}}{Q_{\Delta \nabla \hat{N}_{A,B}^{i,j}}} \quad (22)$$

This solution update satisfies the constraint equations (8) or (9).

Additional formulas for fixing multiple narrow lane ambiguities at the same time and epoch are given in equations (23) and (24).

$$\delta X = Q_{X^0} C^T (CQ_{X^0} C^T)^{-1} W \quad (23)$$

$$Q_{\hat{X}} = Q_{X^0} - M^T (CQ_{X^0} C^T)^{-1} M \quad (24)$$

where C is an m×n matrix;
m is the number of narrow lane ambiguities to be fixed;
n is the number of states in the state vector of the Kalman filter.

The constraint that the narrow lane ambiguities be exact integers can be loosened to account for small system errors. Equations (25) and (26) are modifications of equations (23) and (24) to allow small deviations from integers for the narrow lane ambiguities.

$$\delta X = Q_{X^0} C^T (CQ_{X^0} C^T + R)^{-1} W \quad (25)$$

$$Q_{\hat{X}} = Q_{X^0} - M^T (CQ_{X^0} C^T + R)^{-1} M \quad (26)$$

where R is a diagonal matrix of the a priori accuracy (variance) of the DD narrow lane integer ambiguities and C is an m×n matrix.

Selection of Independent Double-Differenced Integer Ambiguity Sets

Two approaches that can be used to select independent double-differenced integer ambiguity sets are described below. A first approach, described in more detail below, is to use independent baselines. Each baseline corresponds to a pair of reference stations; the term "baseline" refers to a "line" between the locations of two reference stations. In a set of independent baselines, none of the baselines can be reproduced by forming a linear combination of other baselines in the set. For each baseline, the satellite with the highest average elevation is chosen as a reference satellite. From the determined independent baselines and reference satellites, a set containing all of the independent double-differenced integer ambiguities can be determined. A second approach, also described in more detail below, is to form all possible combinations of double-differenced integer ambiguities from all possible baselines. Note that any double-differenced integer ambiguity connected with a common data interval shorter than five to fifteen minutes is ignored, because it is generally difficult to resolve the ambiguities over such short filtering intervals.

Independent Baseline Approach

For a given global network of GNSS receivers (e.g., the reference stations 140, FIG. 1), many different combinations of independent baselines (i.e., baselines between pairs of reference stations) can be formed. Graph theory can be used to form the best combinations of the independent baselines. Given a connected, undirected graph, a spanning tree of that graph is a sub-graph which is a tree and connects all the vertices (reference receivers) together. Any baseline which would cause an area to be enclosed is not an independent baseline. A single graph can have many different spanning trees connecting the receivers together. We can also assign a weight or cost to each edge (baseline), which is a number representing how unfavorable it is, and use this to assign a weight to a spanning tree by computing the sum of the weights of the edges in that spanning tree. A minimum spanning tree or minimum weight spanning tree is then a spanning tree with weight less than or equal to the weight of every other spanning tree. More generally, any undirected graph (not necessarily connected) has a minimum spanning forest, which is a union of minimum spanning trees for its connected components.

If each edge has a distinct weight then there will only be one, unique minimum spanning tree. Prim's algorithm is an algorithm in graph theory that finds a minimum spanning tree for a connected weighted graph. This means it finds a subset of the edges (baseline) that forms a tree that includes every vertex, where the total weight of all the edges in the tree is minimized. The algorithm was discovered in 1930 by mathematician Vojtech Jarnik and later independently by computer scientist Robert C. Prim in 1957 and rediscovered by Edsger Dijkstra in 1959. Therefore it is sometimes called the DJP algorithm, the Jarník algorithm, or the Prim-Jarník algorithm.

The algorithm continuously increases the size of a tree starting with a single vertex until it spans all the vertices. It should be noted that computation time is $O(V^2)$. V is the number of vertices (reference sites) and the big $O$ notation is used in computational complexity theory to describe how the size of the input data affects an algorithm's usage of computational resources (usually running time or memory).

All Possible Baseline Approach

Theoretically, any set with the maximum number of independent DD-ambiguities can be expressed as a linear combination of the others, and they are statistically equivalent to each other if both the estimates and their full covariance matrix are considered. For a system with about sixty reference stations and thirty global navigation satellites, with about 500-700 independent DD-ambiguities, only the estimates and their variances are used for making the decision on ambiguity fixing. This is because it is time-consuming to take the correlation part into account. Different selections of DD-ambiguities lead to ambiguities with different offsets to the nearest integer and different variances, and consequently different efficiencies in the ambiguity fixing. In principle, the independent DD-ambiguities are chosen starting with the most confident one from all possible ambiguities. The dependent ambiguities on the fixed DD ambiguities can be easily removed from the list to be fixed by checking zero fractional DD ambiguities and zero (or very near zero) variance. After independent baselines or all possible baselines are determined, the satellite with the highest average elevation can be chosen as reference satellite. The independent or all possible DD ambiguities information such as base site, rover site, satellite and reference satellite, floating ambiguities and their variance can be stored.

DD Integer Ambiguity Resolution Strategy

The W-ratio for a particular baseline and its estimated double-differenced integer ambiguity value, based on equations (7) and (8), can be computed as shown in equation (27)

$$W-\text{ratio} = \frac{0.5 - \left|[\Delta\nabla\hat{N}_{A,B}^{i,j}] - \Delta\nabla\hat{N}_{A,B}^{i,j}\right|}{\sigma_0 \sqrt{Q_{\Delta\nabla\hat{N}_{A,B}^{i,j}}}} \quad (27)$$

where: $\tau_0$ is the square root of the unit variance, the denominator is (or, alternatively, corresponds to) the standard deviation of the estimated double-differenced integer ambiguity (which is the same as the square root of the variance of the estimated double-differenced integer ambiguity), the square brackets in the numerator represents the roundoff(x) function, and the absolute value in the numerator corresponds to the difference between integer and floating versions of the estimated double-differenced integer ambiguity value. Further information on the W-ratio can be found in (1) J. Wang, M. P. Stewart & M. Tsakiri, "A discrimination test procedure for ambiguity resolution on the fly," Journal of Geodesy, 72(11), 644-653 (1998); and (2) L. Dai, J. Wang, C. Rizos, & S. Han, "Predicting atmospheric biases for real-time ambiguity resolution in GPS/GLONASS reference station networks," Journal of Geodesy, 76, 617-628 (2003).

In practice, $\tau_0$ (in equation (27)) either can be considered to be equal to 1, or can be computed using post-fit residuals as $$\sigma_0 = \sqrt{\frac{V^T P V}{n-t}}$$

where V represents the post-fit residuals; n-t is number of degrees of freedom, and P is the measurement weight matrix (not to be confused with the covariance matrix of the Kalman filter).

In theory, the W-ratio should satisfy the normalized "Student distribution." The W-ratios of the independent ambiguities, or all possible double-differenced integer ambiguities, can be sorted in descending order. The independent double-differenced integer ambiguities can be fixed by applying equations (16) and (18) if the conditions in equations (28) through (30) are satisfied.

$$|[66 \nabla\hat{N}_{A,B}^{i,j}] - 66 \nabla\hat{N}_{A,B}^{i,j}| \leq a \quad (28)$$

$$\sqrt{Q_{\Delta\nabla\hat{N}_{A,B}^{i,j}}} \leq b \quad (29)$$

$$W > c \quad (30)$$

where a, b and c are empirical threshold settings. For example, in some embodiments, a has a value between 0.1 and 0.25 cycles, b has a value between 0.03 and 0.1 cycles, and c has a value of 3 (equivalent to 99.9%) or higher. These threshold parameters can be tuned to optimize the ambiguity resolution process based on large data sets.

After one or more double-differenced integer ambiguities are fixed as integers, i.e., after one or more constraints have been applied, all unfixed double-differenced integer ambiguities and variances from independent unfixed ambiguity sets are re-computed and sorted again. The ambiguity resolution process stops when there is no longer any double-differenced integer ambiguity that has not yet been fixed (i.e., by applying a corresponding constraint to the Kalman filter update computations) and that satisfies equations (28) through (30).

DD Ambiguity Resolution Procedure

Two alternative methods or processes for narrow lane ambiguity resolution are described here. These methods or processes are herein called the independent baseline integer ambiguity resolution process (or procedure) and the all baseline integer ambiguity resolution process (or procedure). These two processes (or procedures) are described next, with reference to FIGS. 5A-5B and FIGS. 6A-6B. The process depicted by the flowchart in FIGS. 6A-6B corresponds to, or replaces, operations 522 and 524 of FIG. 5A.

Independent Baseline Integer Ambiguity Resolution Procedure

1. Determine a set of independent baselines (520, FIG. 5). In some embodiments, this accomplished using the Prim algorithm. The number of independent baselines is equal to the number of reference stations (sites) minus 1. In some embodiments, the independent baselines are mathematically independent, meaning that no baseline in the set can be determined as a linear combination of other baselines in the set.
2. For each baseline, determine the reference satellite with the highest average elevation and compute floating and integer values for the corresponding double-differenced integer ambiguity (520, FIG. 5).
3. For each baseline, store the following information: the two reference stations at the ends of the baseline, satellite identifications, reference satellite identification, double-differenced integer ambiguity, the variance for the double-differenced integer ambiguity, and the W-ratio. Also form a "to-be-fixed DD list" or array (see 602, FIG. 6A). Any double-differenced integer ambiguity connected with a data filtering interval shorter than a predefined interval, typically five to fifteen minutes, is ignored (i.e., not included in the to-be-fixed DD list). Any double-differenced integer ambiguity that corresponds to an unfixed wide lane ambiguity is ignored (i.e., not included in the to-be-fixed DD list). All other double-differenced integer ambiguities (corresponding to the set of independent baselines, excluding the ones to be ignored) are added to the to-be-fixed DD list.
4. Select the double-differenced integer ambiguity from the to-be-fixed DD list that (A) has the maximum W-ratio, and also (B) satisfies the condition equations (28) through (30) (see 604, FIG. 6A). If more than one double-differenced integer ambiguity has the maximum W-ratio value, select the group of double-differenced integer ambiguities with the maximum W-ratio that also satisfy the condition equations (28) through (30); the selected group is called the "best group" of double-differenced integer ambiguities. If there is at least one selected double-differenced integer ambiguity in the to-be-fixed DD list that satisfies the condition equations (28) through (30), proceed to step 5; if none of the double-differenced integer ambiguities remaining on the to-be-fixed DD list satisfy the condition equations, go to step 8 (the ambiguity resolution process ends, at least for the current epoch).

Figure 6A:
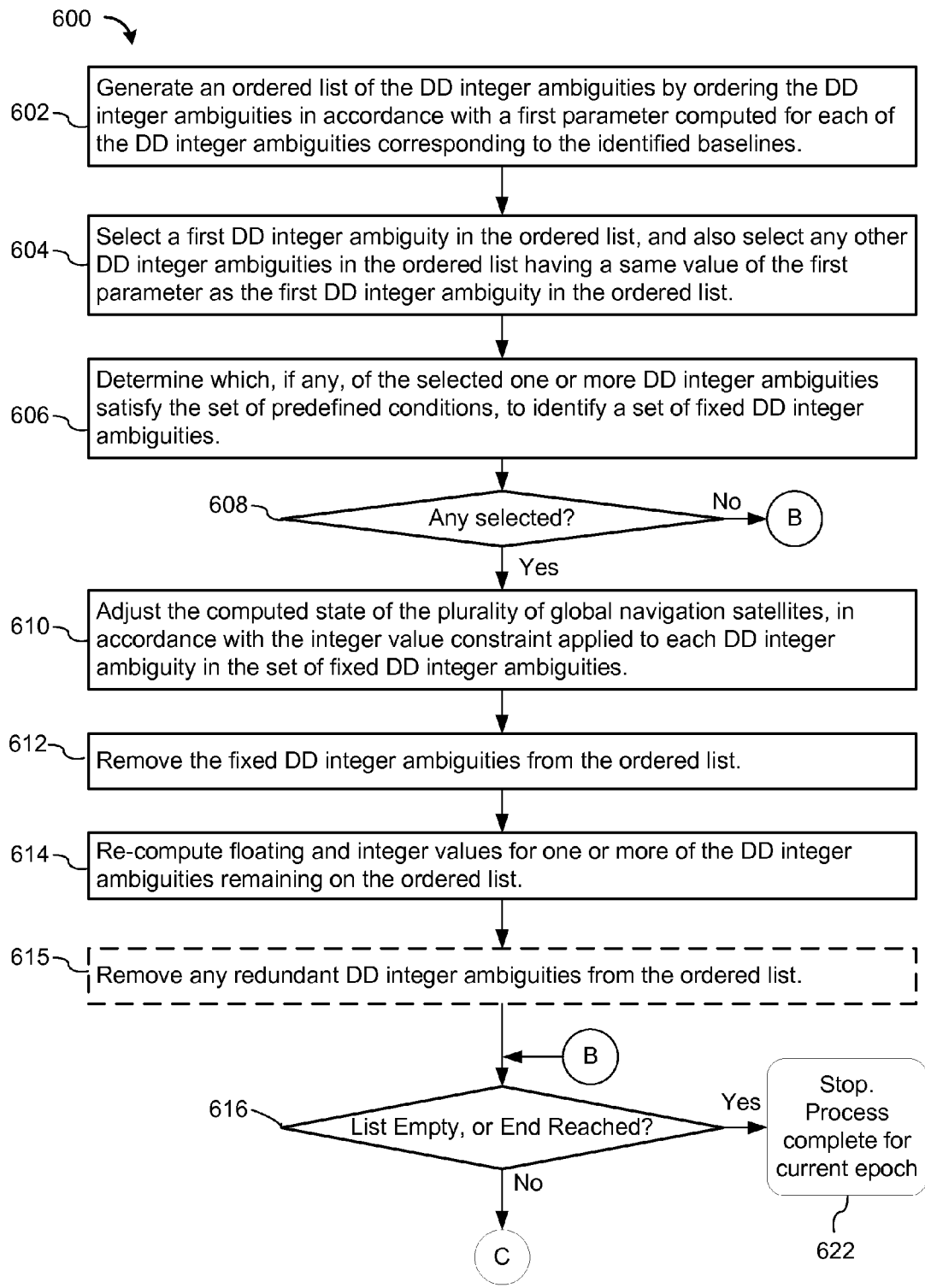
FIGS. 6A-6B depict a flowchart of a method for adjusting the computed estimated state of a plurality of global navigation satellites, according to some embodiments.

Step 4 can be implemented by ordering the double-differenced integer ambiguities in the to-be-fixed DD list in accordance with their W-ratio values, from highest W-ratio to lowest, thereby producing an ordered list (see 602, FIG. 6A). Starting with the double-differenced integer ambiguity or ambiguities having the highest W-ratio value (604, FIG. 6A), test each double-differenced integer ambiguity in the ordered list until either (1) the end of the list is reached without selecting any double-differenced integer ambiguities (616—yes, FIG. 6A), in which case the process goes to step 9, or (2) a double-differenced integer ambiguity is reached found that satisfies the condition equations (28) through (30) (608—yes, FIG. 6A). In the later case, select the identified double-differenced integer ambiguity, and also select any other double-differenced integer ambiguities having the same W-ratio that also satisfies the condition equations (28) through (30) (604, 606, FIG. 6A). Go to step 5 to process the one or more selected double-differenced integer ambiguities.

5. Modify the Kalman filter update equations, and also adjust the state of the Kalman filter, by applying the one or more selected double-differenced integer ambiguity constraints (610, FIG. 6A). If there is just one selected double-differenced integer ambiguity, modify the Kalman filter update equations with DD constraint equations (16) and (18) for the selected single double-differenced integer ambiguity. If two or more double-differenced integer ambiguities have been selected, modify the Kalman filter update equations with DD constraint equations (23) and (24) for the best group of double-differenced integer ambiguities. The one or more selected double-differenced integer ambiguities are now "fixed" double-differenced integer ambiguities (see 610, FIG. 6A).
6. Remove the one or more fixed double-differenced integer ambiguities from the to-be-fixed DD list (see 612, FIG. 6A).
7. Re-compute the DD ambiguities, variance and W-ratio for the remaining double-differenced integer ambiguities on the to-be-fixed DD list (see 614, FIG. 6A). If the to-be-fixed DD list is not empty (616—No), continue processing at step 4.
8. Ambiguity resolution stops (622, FIG. 6A).

All Possible Baseline Integer Ambiguity Resolution Procedure

1. Determine a set of "all possible baselines" (520, FIG. 5). Optionally, a constraint on the maximum baseline length is used (for example, baselines longer than 6000 km are excluded from the set of possible baselines) to reduce unnecessary baselines.
2. For each baseline, determine the reference satellite with the highest average elevation and compute floating and integer values for the corresponding double-differenced integer ambiguity (520, FIG. 5).
3. For each baseline, store the following information: the two reference stations at the ends of the baseline, satellite identifications, reference satellite identification, double-differenced integer ambiguity, the variance for the double-differenced integer ambiguity, and the W-ratio. Also form a "to-be-fixed DD list" or array (see 602, FIG. 6A). Any double-differenced integer ambiguity connected with a data filtering interval shorter than a predefined interval, typically five to fifteen minutes, is ignored (i.e., not included in the to-be-fixed DD list). Any double-differenced integer ambiguity that corresponds to an unfixed wide lane ambiguity is ignored (i.e., not included in the to-be-fixed DD list). All other double-differenced integer ambiguities (corresponding to the set of baselines, excluding the ones to be ignored) are added to the to-be-fixed DD list.

4. Select the double-differenced integer ambiguity from the to-be-fixed DD list that (A) has the maximum W-ratio, and also (B) satisfies the condition equations (28) through (30) (see 604, FIG. 6A). If more than one double-differenced integer ambiguity has the maximum W-ratio value, select the group of double-differenced integer ambiguities with the maximum W-ratio that also satisfy the condition equations (28) through (30); the selected group is called the "best group" of double-differenced integer ambiguities. If there is at least one selected double-differenced integer ambiguity in the to-be-fixed DD list that satisfies the condition equations (28) through (30), proceed to step 5; if none of the double-differenced integer ambiguities remaining on the to-be-fixed DD list satisfy the condition equations, go to step 9 (the ambiguity resolution process ends, at least for the current epoch).

Step 4 can be implemented by ordering the double-differenced integer ambiguities in the to-be-fixed DD list in accordance with their W-ratio values, from highest W-ratio to lowest, thereby producing an ordered list (see 602, FIG. 6A). Starting with the double-differenced integer ambiguity or ambiguities having the highest W-ratio value (604, FIG. 6A), test each double-differenced integer ambiguity in the ordered list until either (1) the end of the list is reached without selecting any double-differenced integer ambiguities (616—yes, FIG. 6A), in which case the process goes to step 9, or (2) a double-differenced integer ambiguity is reached found that satisfies the condition equations (28) through (30) (608—yes, FIG. 6A). In the later case, select the identified double-differenced integer ambiguity, and also select any other double-differenced integer ambiguities having the same W-ratio that also satisfies the condition equations (28) through (30) (604, 606, FIG. 6A). Go to step 5 to process the one or more selected double-differenced integer ambiguities.

5. Modify the Kalman filter update equations, and also adjust the state of the Kalman filter, by applying one or more double-differenced integer ambiguity constraints (610, FIG. 6A). If there is just one selected double-differenced integer ambiguity, modify the Kalman filter update equations with DD constraint equations (16) and (18) for the selected single double-differenced integer ambiguity. If two or more double-differenced integer ambiguities have been selected, modify the Kalman filter update equations with DD constraint equations (23) and (24) for the best group of double-differenced integer ambiguities. The one or more selected double-differenced integer ambiguities are now "fixed" double-differenced integer ambiguities (see 610, FIG. 6A).

6. Remove the one or more fixed double-differenced integer ambiguities from the to-be-fixed DD list (see 612, FIG. 6A).

7. Re-compute the DD ambiguities, variance and W-ratio for the remaining double-differenced integer ambiguities on the to-be-fixed DD list (see 614, FIG. 6A).

8. Remove redundant DD integer ambiguities from the to-be-fixed DD list (see 615, FIG. 6A). Once a sufficient number of integer constraints have been imposed on DD integer ambiguities, some of the remaining DD integer ambiguities will be redundant, because they correspond to linear combinations of DD integer constraints for which integer constraints have already been imposed. In some embodiments, this operation is performed by removing from the to-be-fixed DD list all remaining DD ambiguities for which (A) the fractional part of the DD ambiguity equals zero ({DD}=0), and (B) variance=0. Alternatively, if a non-zero value of R is used in equations (25) and (26), above, remove from the to-be-fixed DD list all remaining DD ambiguities for which (A) the fractional part of the DD ambiguity is less than the square root of R (or other predefined threshold value that corresponds to the square root of R), and (B) variance=0. If the to-be-fixed DD list is not empty (616—No), continue processing at step 4 (618, 620, FIG. 6B).

9. Ambiguity resolution stops (622, FIG. 6A).

FIG. 4 is a flowchart of a method 400, performed by a computer system such as computer system 130 (FIG. 1, FIG. 3), for computing an estimated state of a plurality of global navigation satellites, and for adjusting the computed estimated state by applying constraints on one or more double-differenced integer ambiguities that satisfy predefined criteria, according to some embodiments. In some embodiments, operations 402-408 of FIG. 4 are performed by the Kalman filter module 320 (FIG. 3) of computer system 130, operation 412 is performed by correction module 330, and operation 414 is performed by communication module 314.

The computer system receives (402), from a plurality of reference stations (140, FIG. 1) at known locations, a plurality of satellite navigation measurements of signals from a plurality of global navigation satellites (110, FIG. 1). The computer system computes (404) a state of the plurality of global navigation satellites based on the received satellite navigation measurements. In some embodiments, the computer uses a Kalman filter to perform this computation. For example, Kalman filter module 320 (FIG. 3) uses a Kalman filter to calculate an estimated state of the plurality of global navigation satellites (e.g., the state 326 of the global navigation satellites 110-1 to 110-N) for the current measurement epoch based on the plurality of satellite navigation measurements. In some embodiments, the state 326 of the plurality of global navigation satellites includes a position of each global navigation satellite in the plurality of global navigation satellites, a velocity of each global navigation satellite in the plurality of global navigation satellites, and a time reported by each global navigation satellite in the plurality of global navigation satellites. In some embodiments, the state of the plurality of global navigation satellites for the measurement epoch is calculated using a closed form update equation.

Operation 404 is sometimes herein called the initial computation of the state of the plurality of global navigation satellites, which is followed by an adjustment operation (408), described below. In some embodiments, the initial computation of the state of the plurality of global navigation satellites includes computing and resolving single-difference wide lane ambiguities (406). As described above, the wide lane ambiguities are first resolved, for example using the conventional techniques described above. Then the resolved wide lane ambiguities are validated, and any incorrect wide lane ambiguity resolutions are fixed, for example by restoring the corresponding floating ambiguity values. By performing wide lane ambiguity resolution, in conjunction with the known locations of the reference stations, the estimated state of the global navigation satellites, also which is also called the state of the Kalman filter, is made ready for the application of double-differenced integer ambiguity constraints (408).

As noted below, any baseline (or, equivalently, any double-differenced integer ambiguity) corresponding to a "reference station—satellite" pair for which the wide lane ambiguity resolution was not successful is not a candidate for the application of a double-differenced integer ambiguity constraint. Stated another way, since each respective double-differenced integer ambiguity is dependent on accurate measurements by two reference stations of the same two signals from a reference satellite, if any of those measurements (for a respective double-differenced integer ambiguity) fails to satisfy predefined requirements for wide lane integer ambiguity resolution, that double-differenced integer ambiguity is not a candidate for the application of an integer constraint.

Figure 5A:
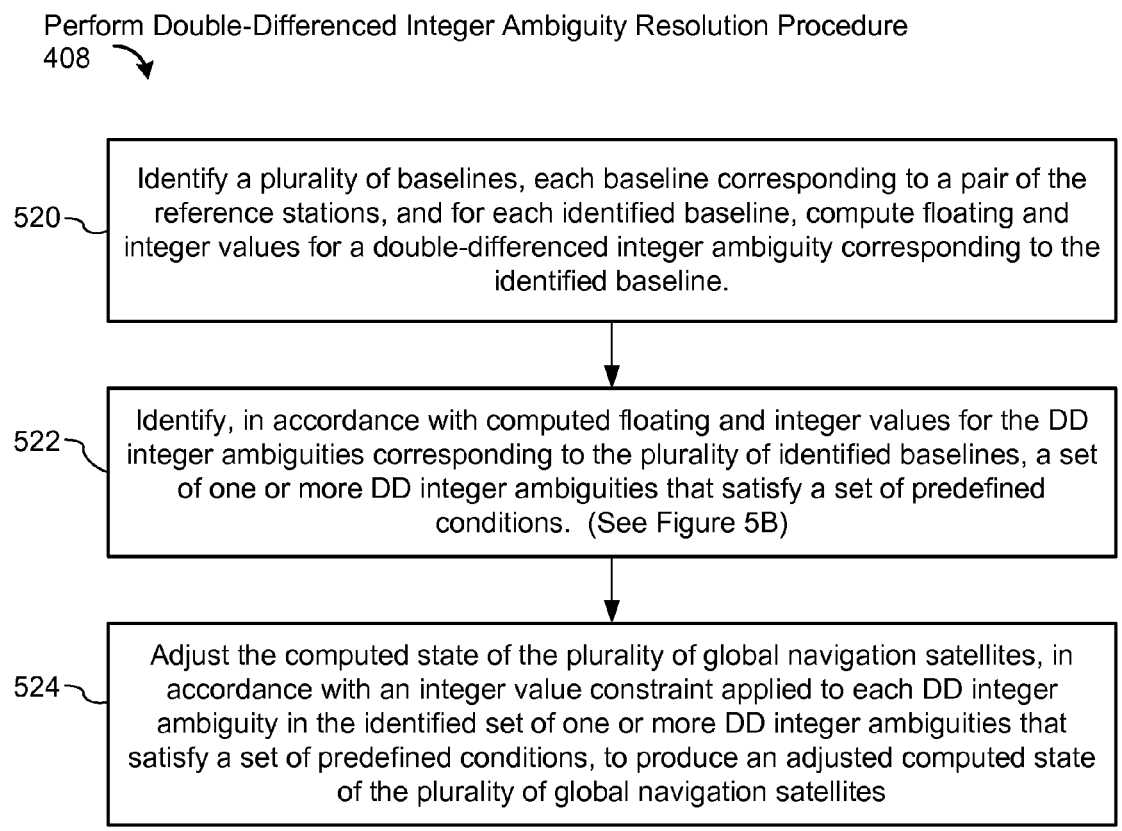
FIGS. 5A-5B depict a flowchart of a method for adjusting the computed estimated state of a plurality of global navigation satellites, according to some embodiments.
Figure 5B:
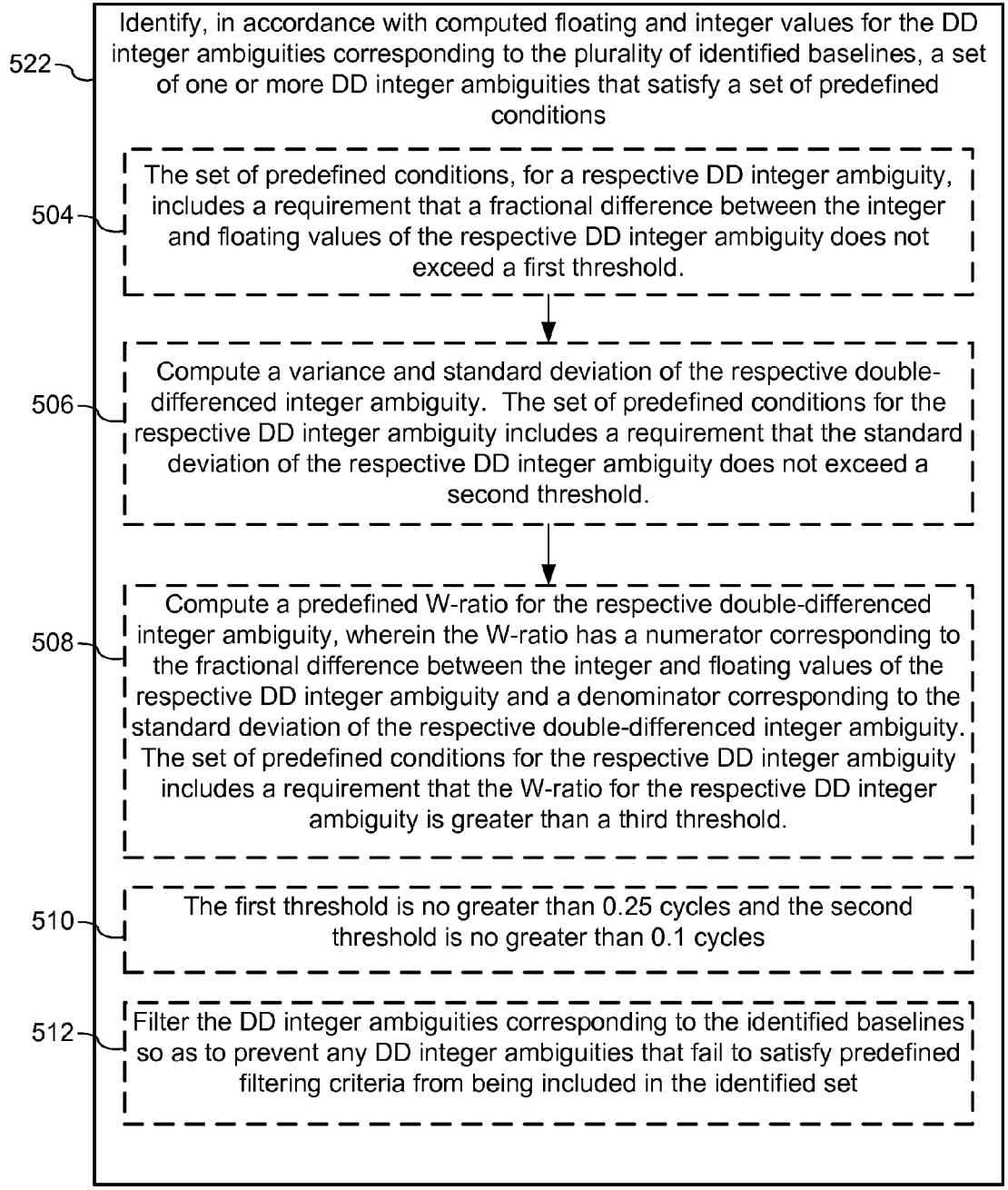

After the computation of an estimated state of the global navigation satellites (406), the process 400 continues by performing a double-differenced integer ambiguity resolution procedure (408) to identify double-differenced integer ambiguities that satisfy a set of predefined conditions, and to adjust the computed state of the global navigation satellites by adding an integer constraint to the Kalman filter for each double-differenced integer ambiguity that satisfies the predefined set of conditions. In some embodiments, the double-differenced integer ambiguity resolution procedure is implemented in accordance with the flowchart shown in FIGS. 5A-5B, as discussed in more detail below. In some embodiments, the double-differenced integer ambiguity resolution procedure is implemented in accordance with the flowchart shown in FIGS. 6A-6B, as discussed in more detail below. It is noted that the flowchart in FIGS. 5A-5B is not inconsistent with the flowchart shown in FIGS. 6A-6B, but instead these two flowcharts address the double-differenced integer ambiguity resolution procedure from different viewpoints and at different levels of detail.

Performing the double-differenced integer ambiguity resolution procedure for a respective measurement epoch adjusts the estimated state of the plurality of global navigation satellites by taking into account the impact of the integer constraints imposed on one or more double-differenced integer ambiguities. In some embodiments, when an integer constraint is imposed on a single selected double-differenced integer ambiguity, the adjustments to the estimated state are made in accordance with Kalman filter update equations (16) and (18), as described above. In some embodiments, when integer constraints are applied to two or more double-differenced integer ambiguities, the adjustments to the estimated state are made in accordance with equations (23) and (24), as described above.

In some embodiments, upon completion of the double-differenced integer ambiguity resolution procedure (408) for the current measurement epoch, the revised state of the global navigation satellites is used to calculate correction signals (e.g., the correction signals 132) that correct for orbital deviations of the global navigation satellites 110-1 to 110-N (412). The correction module 330 uses the revised state of the plurality of global navigation satellites to calculate correction signals that compensate for orbital deviations of the plurality of global navigation satellites (412). As noted above, in some embodiments corrections for tropospheric effects and/or ionospheric effects are computed using techniques well known to those skilled in the art, and those corrections are included in the correction signals. The computer system 130 then transmits (414) the correction signals to one or more satellite navigation receivers 120. In some embodiments, the correction signals are transmitted via one or more communication satellites 160. In other embodiments, other communications networks or media are used to convey the correction signals to satellite navigation receivers 120.

In some embodiments, upon completion of the double-differenced integer ambiguity resolution procedure (408) for the current measurement epoch, the process 400 is repeated, starting with operation 402, for a next measurement epoch.

Referring to FIG. 5A, in some embodiments, performance of the double-differenced integer ambiguity resolution procedure (408) includes identifying a plurality of baselines, each baseline corresponding to a pair of the reference stations, and for each identified baseline, computing floating and integer values for a double-differenced integer ambiguity corresponding to the identified baseline (520). In some embodiments, the identification of baselines (520) is implemented by identifying a set of mathematically independent baselines, as described above. In other embodiments, a set of baselines are identified without requiring that they be independent, and instead a larger set of baselines is initially identified. In the latter embodiments, each time integer constraints are imposed on one or more double-differenced integer ambiguities, both the corresponding baselines and all baselines that are linear combinations of the baselines for which integer constraints have been applied are marked as having been processed (see operations 612 and 615, FIG. 6A).

After identifying the baselines (520), the double-differenced integer ambiguity resolution procedure (408) identifies, in accordance with the computed floating and integer values for the double-differenced integer ambiguities corresponding to the plurality of identified baselines, a set of one or more double-differenced integer ambiguities that satisfy a set of predefined conditions (522). The predefined conditions are described above with respect to equations (28), (29) and (30).

In some embodiments, the set of predefined conditions for a respective double-differenced integer ambiguity includes a requirement that a fractional difference between the integer and floating values of the respective double-differenced integer ambiguity does not exceed a first predefined threshold value (504, FIG. 5B). For example see equation (28), and the corresponding discussion, above. Furthermore, in some embodiments, the method includes computing a variance and standard deviation of the respective double-differenced integer ambiguity, and the set of predefined conditions for the respective double-differenced integer ambiguity includes a requirement that the standard deviation of the respective double-differenced integer ambiguity does not exceed a second predefined threshold value (506, FIG. 5B). For example, see equation (29) and the corresponding discussion, above. In some embodiments, the first threshold is no greater than 0.25 cycles and the second threshold is no greater than 0.1 cycles (510, FIG. 5B).

Yet further, in some embodiments, operation 522 includes computing a predefined W-ratio (e.g., see equation (27) above) for the respective double-differenced integer ambiguity, wherein the W-ratio has a numerator corresponding to the fractional difference between the integer and floating values of the respective double-differenced integer ambiguity and a denominator corresponding to the standard deviation of the respective double-differenced integer ambiguity, and wherein set of predefined conditions for the respective double-differenced integer ambiguity includes a requirement that the W-ratio for the respective double-differenced integer ambiguity is greater than a third threshold (508). Furthermore, the set of predefined conditions for the respective double-differenced integer ambiguity includes a requirement that a predefined W-ratio have a value that exceeds a third predefined threshold value (e.g., see equations (27) and (30), and the corresponding discussion, above). In some embodiments, the third predefined threshold is no less than 2.5; in some other embodiments the third predefined threshold is no less than 3.0.

In some embodiments, after identifying the set of one or more double-differenced integer ambiguities that satisfy the set of predefined conditions (522), the double-differenced integer ambiguity resolution procedure (408) adjusts the computed state of the plurality of global navigation satellites, in accordance with an integer value constraint applied to each double-differenced integer ambiguity in the identified set of one or more double-differenced integer ambiguities that satisfy the set of predefined conditions, to produce an adjusted computed state of the plurality of global navigation satellites (524).

In some embodiments, the set of predefined conditions includes a requirement, for a respective double-differenced integer ambiguity, that both corresponding wide lane ambiguities have been fixed. Any double-differenced integer ambiguity corresponding to an unfixed wide lane ambiguity is ignored, and there not even a candidate for being identified as a double-differenced integer ambiguity that satisfies the set of predefined conditions. Furthermore, in some embodiments, the double-differenced integer ambiguities corresponding to the identified baselines is filtered, prior to perform operation 522, or at the beginning of operation 522, so as to prevent any double-differenced integer ambiguities that fail to satisfy predefined filtering criteria from being included in the identified set (512). For example, the predefined filtering criteria can include the requirement, for a respective double-differenced integer ambiguity, that corresponding wide lane ambiguities have been processed for at least a predefined length of time (e.g., 4 to 6 hours) so as provide a reliable basis for determining a variance of the respective double-differenced integer ambiguity and for having a high level of confidence in the resolution of the corresponding wide lane ambiguities.

Figure 6B:
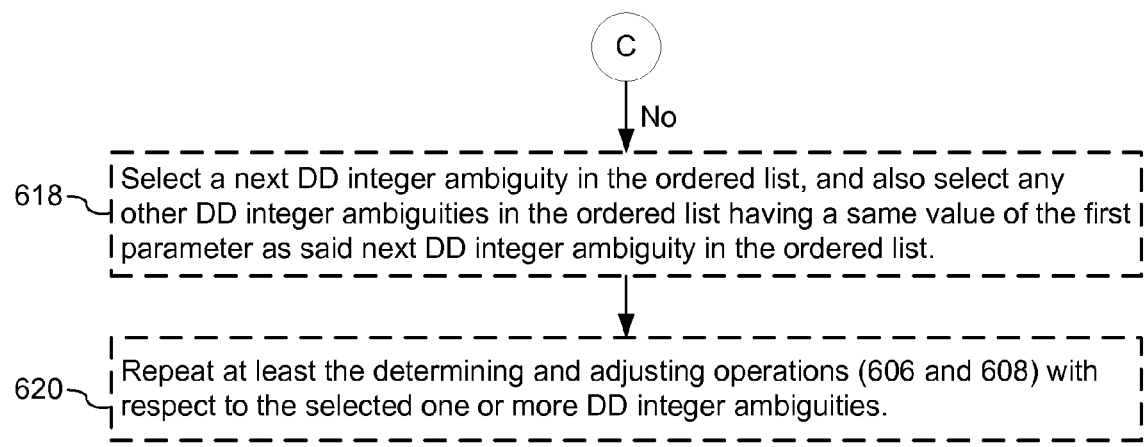

The process depicted by the flowchart in FIGS. 6A-6B corresponds to operations 522 and 524 (FIG. 5A) of a double-differenced integer ambiguity resolution procedure (408) to identify double-differenced integer ambiguities that satisfy a set of predefined conditions, and to adjust the computed state of the global navigation satellites by adding an integer constraint to the Kalman filter for each double-differenced integer ambiguity that satisfies the predefined set of conditions. FIGS. 6A-6B are described above.

Figure 7:
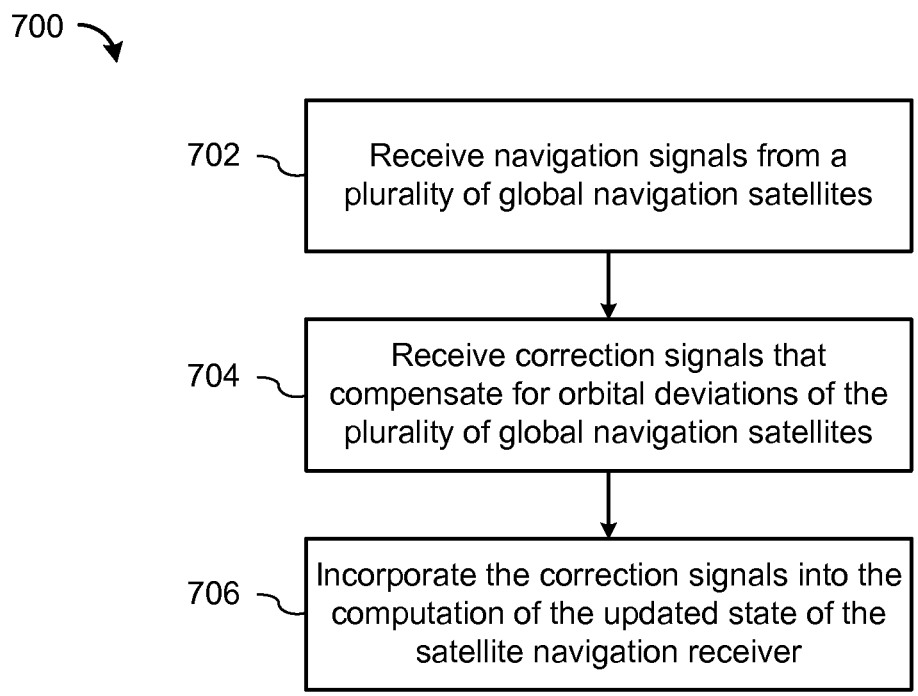
FIG. 7 is a flowchart of a method for adjusting the state of a satellite navigation receiver (e.g., a mobile satellite navigation receiver, distinct from the reference stations) based on correction signals sent by a computer system (e.g., the system of FIG. 3), according to some embodiments.

Referring to FIG. 7, in some embodiments, a satellite navigation receiver 120 (FIG. 1, FIG. 2) receives navigation signals from a plurality of global navigation satellites (702), and also receives correction signals (e.g., correction signals 132) that correct for orbital deviations of the global navigation satellites (704). For example, the satellite navigation receiver 120 may receive the correction signals 132 from the computer system 130 via one or more communication satellites 160-1 to 160-P. FIG. 7 is a flowchart of a method 700 for adjusting the state of the satellite navigation receiver 120 based on the received correction signals, according to some embodiments. The GNSS module 218 receives navigation signals from a plurality of global navigation satellites (702), and also receives (704) correction signals that compensate for orbital deviations of the plurality of global navigation satellites. The GNSS module 218 then incorporates the correction signals (706) into its computation of the updated state of the satellite navigation receiver. For example, the GNSS module 218 may incorporate the correction signals by revising the navigation satellite measurements, prior to their use in computing an update state of the satellite navigation receiver 120, so as to compensate for various sources of error, such as orbital deviation of the satellites from their predicted orbits (e.g., orbits predicted using the ephemeris data broadcast by the navigation satellites; in some embodiments ephemeris data for navigation satellites is also available from the GNSS (e.g., GPS) operations center or other service tasked with the timely distribution of ephemeris data), tropospheric effects and ionospheric effects.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, performed by a computer system that includes one or more processors and memory storing one or more programs, the one or more processors for executing the one or more programs, the method comprising:

receiving, from a plurality of reference stations at known locations, a plurality of satellite navigation measurements of signals from a plurality of global navigation satellites;

computing a state of the plurality of global navigation satellites based on the received satellite navigation measurements;

identifying a plurality of baselines, each baseline corresponding to a pair of the reference stations, and for each identified baseline, computing floating and integer values for a double-differenced integer ambiguity corresponding to the identified baseline;

identifying, in accordance with the computed floating and integer values for the double-differenced integer ambiguities corresponding to the plurality of identified baselines, a set of one or more double-differenced integer ambiguities that satisfy a set of predefined conditions; and adjusting the computed state of the plurality of global navigation satellites, in accordance with an integer value constraint applied to each double-differenced integer ambiguity in the identified set of one or more double-differenced integer ambiguities that satisfy the set of predefined conditions, to produce an adjusted computed state of the plurality of global navigation satellites.

2. The method of claim 1, further including computing correction information in accordance with the adjusted computed state of the plurality of global navigation satellites; and transmitting the correction information to a plurality of navigation receivers.

3. The method of claim 1, wherein the correction information includes correction values for each of the global navigation satellites in the plurality of global navigation satellites.

4. The method of claim 1, wherein the correction information includes correction values for two or more of the global navigation satellites in the plurality of global navigation satellites.

5. The method of claim 1 wherein the set of predefined conditions, for a respective double-differenced integer ambiguity, includes a requirement that a fractional difference between the integer and floating values of the respective double-differenced integer ambiguity does not exceed a first threshold.

6. The method of claim 5, including computing a variance and standard deviation of the respective double-differenced integer ambiguity, wherein set of predefined conditions for the respective double-differenced integer ambiguity includes a requirement that the standard deviation of the respective double-differenced integer ambiguity does not exceed a second threshold.

7. The method of claim 6, including computing a predefined W-ratio for the respective double-differenced integer ambiguity, wherein the W-ratio has a numerator corresponding to the fractional difference between the integer and floating values of the respective double-differenced integer ambiguity and a denominator corresponding to the standard deviation of the respective double-differenced integer ambiguity, and wherein set of predefined conditions for the respective double-differenced integer ambiguity includes a requirement that the W-ratio for the respective double-differenced integer ambiguity is greater than a third threshold.

8. The method of claim 7, wherein the first threshold is no greater than 0.25 cycles and the second threshold is no greater than 0.1 cycles.

9. The method of claim 1, wherein the identified baselines includes only mathematically independent baselines.

10. The method of claim 1, wherein identifying the set of one or more double-differenced integer ambiguities that satisfy the set of predefined conditions includes filtering the double-differenced integer ambiguities corresponding to the identified baselines so as to prevent any double-differenced integer ambiguities that fail to satisfy predefined filtering criteria from being included in the identified set.

11. The method of claim 1, wherein identifying the set of one or more double-differenced integer ambiguities that satisfy the set of predefined conditions and adjusting the computed state of the plurality of global navigation satellites comprises:

generating an ordered list of the double-differenced integer ambiguities by ordering the double-differenced integer ambiguities in accordance with a first parameter computed for each of the double-differenced integer ambiguities corresponding to the identified baselines, selecting a first double-differenced integer ambiguity in the ordered list, and also selecting any other double-differenced integer ambiguities in the ordered list having a same value of the first parameter as the first double-differenced integer ambiguity in the ordered list, determining which, if any, of the selected one or more double-differenced integer ambiguities satisfy the set of predefined conditions, to identify a set of fixed double-differenced integer ambiguities;

adjusting the computed state of the plurality of global navigation satellites, in accordance with the integer value constraint applied to each double-differenced integer ambiguity in the set of fixed double-differenced integer ambiguities;

removing the fixed double-differenced integer ambiguities from the ordered list;

re-computing floating and integer values for one or more of the double-differenced integer ambiguities remaining on the ordered list;

selecting a next double-differenced integer ambiguity in the ordered list, and also selecting any other double-differenced integer ambiguities in the ordered list having a same value of the first parameter as said next double-differenced integer ambiguity in the ordered list; and repeating at least the determining and adjusting operations with respect to the selected one or more double-differenced integer ambiguities.

12. The method of claim 1, wherein the method is repeated for each of a sequence of measurement epochs.

13. The method of claim 1, wherein the state of the plurality of global navigation satellites includes a position of each global navigation satellite in the plurality of global navigation satellites, a velocity of each global navigation satellite in the plurality of global navigation satellites, and a time reported by each global navigation satellite in the plurality of global navigation satellites.

14. The method of claim 1, wherein computing the state of the plurality of global navigation satellites comprises computing the state of the plurality of global navigation satellites using a closed-form update equation.

15. A computer system, comprising:
one or more processors;
memory storing one or more programs for execution by the one or more processors, the one or more programs comprising instructions that when executed by the one or more processors cause the computer system to:
receive, from a plurality of reference stations at known locations, a plurality of satellite navigation measurements of signals from a plurality of global navigation satellites;
compute a state of the plurality of global navigation satellites based on the received satellite navigation measurements;
identify a plurality of baselines, each baseline corresponding to a pair of the reference stations, and for each identified baseline, computing floating and integer values for a double-differenced integer ambiguity corresponding to the identified baseline;
identify, in accordance with the computed floating and integer values for the double-differenced integer ambiguities corresponding to the plurality of identified baselines, a set of one or more double-differenced integer ambiguities that satisfy a set of predefined conditions; and
adjust the computed state of the plurality of global navigation satellites, in accordance with an integer value constraint applied to each double-differenced integer ambiguity in the identified set of one or more double-differenced integer ambiguities that satisfy the set of predefined conditions, to produce an adjusted computed state of the plurality of global navigation satellites.

16. The computer system of claim 15, wherein the one or more programs further comprise instructions which we executed by the one or more processors cause the computer system to:
compute correction information in accordance with the adjusted computed state of the plurality of global navigation satellites; and
transmit the correction information to a plurality of navigation receivers.

17. The computer system of claim 15, wherein the correction information includes correction values for each of the global navigation satellites in the plurality of global navigation satellites.

18. The computer system of claim 15, wherein the correction information includes correction values for two or more of the global navigation satellites in the plurality of global navigation satellites.

19. The computer system of claim 15, wherein the set of predefined conditions, for a respective double-differenced integer ambiguity, includes a requirement that a fractional difference between the integer and floating values of the respective double-differenced integer ambiguity does not exceed a first threshold.

20. The computer system of claim 15, wherein the one or more programs further comprise instructions which we executed by the one or more processors cause the computer system to compute a variance and standard deviation of the respective double-differenced integer ambiguity, wherein set of predefined conditions for the respective double-differenced integer ambiguity includes a requirement that the standard deviation of the respective double-differenced integer ambiguity does not exceed a second threshold.

21. The computer system of claim 20, wherein the one or more programs further comprise instructions which we executed by the one or more processors cause the computer system to compute a predefined W-ratio for the respective double-differenced integer ambiguity, wherein the W-ratio has a numerator corresponding to the fractional difference between the integer and floating values of the respective double-differenced integer ambiguity and a denominator corresponding to the standard deviation of the respective double-differenced integer ambiguity, and wherein set of predefined conditions for the respective double-differenced integer ambiguity includes a requirement that the W-ratio for the respective double-differenced integer ambiguity is greater than a third threshold.

22. A non-transitory computer readable storage medium, storing one or more programs configured for execution by a computer system, the one or more programs comprising instructions that when executed by the one or more processors cause the computer system to:

receive, from a plurality of reference stations at known locations, a plurality of satellite navigation measurements of signals from a plurality of global navigation satellites;

compute a state of the plurality of global navigation satellites based on the received satellite navigation measurements;

identify a plurality of baselines, each baseline corresponding to a pair of the reference stations, and for each identified baseline, computing floating and integer values for a double-differenced integer ambiguity corresponding to the identified baseline;

identify, in accordance with the computed floating and integer values for the double-differenced integer ambiguities corresponding to the plurality of identified baselines, a set of one or more double-differenced integer ambiguities that satisfy a set of predefined conditions; and adjust the computed state of the plurality of global navigation satellites, in accordance with an integer value constraint applied to each double-differenced integer ambiguity in the identified set of one or more double-differenced integer ambiguities that satisfy the set of predefined conditions, to produce an adjusted computed state of the plurality of global navigation satellites.

23. The non-transitory computer readable storage medium of claim 22, wherein the one or more programs further comprise instructions which we executed by the one or more processors cause the computer system to:

compute correction information in accordance with the adjusted computed state of the plurality of global navigation satellites; and transmit the correction information to a plurality of navigation receivers.

24. The non-transitory computer readable storage medium of claim 22, wherein the correction information includes correction values for each of the global navigation satellites in the plurality of global navigation satellites.

25. The non-transitory computer readable storage medium of claim 22, wherein the correction information includes correction values for two or more of the global navigation satellites in the plurality of global navigation satellites.

26. The non-transitory computer readable storage medium of claim 22, wherein the set of predefined conditions, for a respective double-differenced integer ambiguity, includes a requirement that a fractional difference between the integer and floating values of the respective double-differenced integer ambiguity does not exceed a first threshold.

27. The non-transitory computer readable storage medium of claim 22, wherein the one or more programs further comprise instructions which we executed by the one or more processors cause the computer system to compute a variance and standard deviation of the respective double-differenced integer ambiguity, wherein set of predefined conditions for the respective double-differenced integer ambiguity includes a requirement that the standard deviation of the respective double-differenced integer ambiguity does not exceed a second threshold.

28. The non-transitory computer readable storage medium of claim 27, wherein the one or more programs further comprise instructions which we executed by the one or more processors cause the computer system to compute a predefined W-ratio for the respective double-differenced integer ambiguity, wherein the W-ratio has a numerator corresponding to the fractional difference between the integer and floating values of the respective double-differenced integer ambiguity and a denominator corresponding to the standard deviation of the respective double-differenced integer ambiguity, and wherein set of predefined conditions for the respective double-differenced integer ambiguity includes a requirement that the W-ratio for the respective double-differenced integer ambiguity is greater than a third threshold.

* * * * *

UNITED STATES PATENT AND TRADEMARK OFFICE
CERTIFICATE OF CORRECTION

| | | |
|---|---|---|
| PATENT NO. | : 8,659,474 B2 | Page 1 of 1 |
| APPLICATION NO. | : 13/299324 | |
| DATED | : February 25, 2014 | |
| INVENTOR(S) | : Liwen L. Dai et al. | |

It is certified that error appears in the above-identified patent and that said Letters Patent is hereby corrected as shown below:

In the claims:

Claim 6, col. 29, line 9, please delete "wherein set" and insert --wherein the set--; and Claim 7, col. 29, line 21, please delete "wherein set" and insert --wherein the set--; and Claim 16, col. 30, line 52, please delete "we" and insert --when--; and Claim 20, col. 31, line 8, please delete "we" and insert --when--; and Claim 20, col. 31, line 11, please delete "wherein set" and insert --wherein the set--; and Claim 21, col. 31, line 17, please delete "we" and insert --when--; and Claim 21, col. 31, line 25, please delete "wherein set" and insert --wherein the set--; and Claim 23, col. 32, line 7, please delete "we" and insert --when--; and Claim 27, col. 32, line 30, please delete "we" and insert --when--; and Claim 27, col. 32, line 33, please delete "wherein set" and insert --wherein the set--; and Claim 28, col. 32, line 40, please delete "we" and insert --when--; and Claim 28, col. 32, line 48, please delete "wherein set" and insert --wherein the set--.

Signed and Sealed this
Twentieth Day of May, 2014

Michelle K. Lee
*Deputy Director of the United States Patent and Trademark Office*